United States Patent
Kamijima

(10) Patent No.: US 8,031,300 B2
(45) Date of Patent: Oct. 4, 2011

(54) LIQUID CRYSTAL DEVICE AND PROJECTOR

(75) Inventor: Shinji Kamijima, Hara-mura (JP)

(73) Assignee: Seiko Epson Corporation, Tokyo (JP)

( * ) Notice: Subject to any disclaimer, the term of this patent is extended or adjusted under 35 U.S.C. 154(b) by 957 days.

(21) Appl. No.: 11/615,525

(22) Filed: Dec. 22, 2006

(65) Prior Publication Data

US 2007/0182874 A1  Aug. 9, 2007

(30) Foreign Application Priority Data

Feb. 7, 2006  (JP) ................................ 2006-029344

(51) Int. Cl.
G02F 1/1335 (2006.01)
G02F 1/1368 (2006.01)
G02F 1/133 (2006.01)

(52) U.S. Cl. .............. 349/110; 349/37; 349/42; 349/95; 349/122; 349/160

(58) Field of Classification Search .................. 349/5, 8, 349/37, 42, 43, 57, 95, 110, 111; 345/92, 345/96
See application file for complete search history.

(56) References Cited

U.S. PATENT DOCUMENTS

| | | | |
|---|---|---|---|
| 5,510,916 A | 4/1996 | Takahashi | |
| 5,808,712 A * | 9/1998 | Hishida et al. .................. | 349/95 |
| 6,313,481 B1 | 11/2001 | Ohtani et al. | |
| 6,576,504 B2 | 6/2003 | Ohtani et al. | |
| 6,610,997 B2 * | 8/2003 | Murade ........................... | 257/72 |
| 6,765,637 B2 | 7/2004 | Takenaka | |
| 6,770,908 B2 | 8/2004 | Sato | |
| 6,953,949 B2 | 10/2005 | Murade | |
| 7,265,742 B2 | 9/2007 | Iisaka | |
| 2004/0027516 A1* | 2/2004 | Liu .............................. | 349/113 |
| 2007/0063953 A1 | 3/2007 | Iisaka | |

FOREIGN PATENT DOCUMENTS

| | | |
|---|---|---|
| CN | 1334483 A | 2/2002 |
| CN | 1425946 A | 6/2003 |
| CN | 1229682 C | 11/2005 |
| JP | A 02-064690 | 3/1990 |
| JP | 04-030140 A | 2/1992 |
| JP | A-4-30140 | 2/1992 |
| JP | 06-194687 A | 7/1994 |
| JP | 2001-056485 A | 2/2001 |
| JP | 2002-244154 A | 8/2002 |
| JP | 2004-177930 A | 6/2004 |

* cited by examiner

Primary Examiner — Dung Nguyen
Assistant Examiner — Tai Duong
(74) Attorney, Agent, or Firm — Oliff & Berridge, PLC

(57) ABSTRACT

Provided is a liquid crystal device including: a plurality of data lines and a plurality of scanning lines which cross each other; switching elements which are provided in correspondence with intersections between the data lines and the scanning lines; pixel electrodes connected to the switching elements; pixels configured in correspondence with the pixel electrodes; an image display region configured by the plurality of pixels; a first substrate having at least the switching elements; a second substrate which faces the first substrate; and liquid crystal interposed between the first substrate and the second substrate, wherein light incident from the first substrate is modulated by the liquid crystal, a light-shielding film is provided on a light incident side of at least the switching elements of the first substrate, and at least a portion corresponding to the image display region of the second substrate includes only a transparent layer which transmits light incident to the liquid crystal.

13 Claims, 16 Drawing Sheets

LIQUID CRYSTAL DEVICE AND PROJECTOR

BACKGROUND

1. Technical Field

The present invention relates to a liquid crystal device and a projector.

2. Related Art

Projectors have come into widespread use in homes. Accordingly, a spatial light modulation device of a projector having low cost, long life span and capable of producing images of high brightness is desired to be obtained. A representative example of the spatial light modulation device is a liquid crystal device. A known example of a liquid crystal display is an active matrix type liquid crystal device having thin-film transistors TFTs as pixel switching elements. In this liquid crystal device, when light is irradiated onto a channel region of the TFT provided in each of a plurality of pixels provided in the liquid crystal device, a light leakage current occurs due to excitation by the light and thus the characteristics of the TFT are changed. Accordingly, the TFTs are protected by light-shielding films provided on a TFT array substrate and an opposite substrate (see, for example, JP-A-2-64690).

Generally, in the liquid crystal device mounted in the projector, the opposite substrate on which the TFTs are not formed is disposed toward a light source. The light-shielding film of the opposite substrate blocks the light emitted from the light source and prevents the light from directly entering the TFTs provided at the opposite side thereof. The light-shielding film provided on the TFT array substrate prevents returning light from entering the rear surface of the TFTs. Accordingly, the TFTs are doubly protected.

Since such light-shielding films can be seen as thin black lines in regions between the projected pixels, surface roughness is increased and thus display quality deteriorates when displaying a moving image. Since the TFTs are shielded from light by the light-shielding film provided doubly, it can be difficult to obtain sufficient brightness. This tendency is more pronounced in an image formed by rows of pixels each having a small size in recent devices due to progress of manufacturing technology, compared with other existing devices in which the size of the pixel is sufficiently large compared with that of the light-shielding film.

SUMMARY

An object of the invention is to provide a liquid crystal device and a projector which are capable of suppressing an aperture ratio from deteriorating due to the presence of a light-shielding film to enable display an image having high brightness and high quality.

According to an aspect of the invention, there is provided a liquid crystal device comprising: a plurality of data lines and a plurality of scanning lines which cross each other; switching elements which are provided in correspondence with intersections between the data lines and the scanning lines; pixel electrodes connected to the switching elements; pixels configured in correspondence with the pixel electrodes; an image display region configured by the plurality of pixels; a first substrate having at least the switching elements; a second substrate which faces the first substrate; and liquid crystal interposed between the first substrate and the second substrate, wherein light incident from the first substrate is modulated by the liquid crystal, a light-shielding film is provided on a light incident side of at least the switching elements of the first substrate, and a portion corresponding to at least the image display region of the second substrate includes only a transparent layer which transmits light incident to the liquid crystal.

By this configuration, since at least the rear surface of the switching element is protected by the light-shielding film, the light from a light source does not directly enter the switching element. Since returning light is prevented by a gate electrode of the TFT used as the switching element, a problem that light leakage occurs due to absence of the light-shielding film on the second substrate does not occur. By removing the light-shielding film on the second substrate, it is possible to improve brightness and to suppress the shadow of the light-shielding film to improve display quality.

According to another aspect of the invention, there is provided a liquid crystal device comprising: a plurality of data lines and a plurality of scanning lines which cross each other; switching elements which are provided in correspondence with intersections between the data lines and the scanning lines; pixel electrodes connected to the switching elements; pixels configured in correspondence with the pixel electrodes; a first substrate having at least the switching elements; a second substrate which faces the first substrate; and liquid crystal interposed between the first substrate and the second substrate, wherein light incident from the first substrate is modulated by the liquid crystal, light-shielding films are provided on a light incident side of the switching elements of the first substrate and at positions which face the switching elements of the second substrate, and an aperture ratio of the light-shielding film of the second substrate is larger than that of the light-shielding film of the first substrate.

By this configuration, since at least the rear surface of the switching element is protected by the light-shielding film, the light from a light source does not directly enter the switching element. Since returning light is prevented by the light-shielding film of the second substrate and a gate electrode of the TFT used as the switching element, a problem such as light leakage does not occur. By increasing the aperture ratio of the light-shielding film on the second substrate, it is possible to improve brightness and to suppress the shadow of the light-shielding film to improve display quality.

In the invention, the light-shielding film of the first substrate may include a first light-shielding film provided at the light incident side of the switching elements and a second light-shielding film provided at the opposite side of the light incident side of the switching elements.

By this configuration, light incident from the lower side of the switching element can be shielded by the first light-shielding film and returning light incident from the upper side of the switching element can be shielded by the second light-shielding film. By doubly protecting the switching element by the upper and lower light-shielding films, it is possible to provide a reliable liquid crystal device.

In the invention, the first substrate may be provided with a first groove formed in a region in which the switching elements are disposed and a second groove formed in a region which faces the switching elements in the first groove, and the first light-shielding film may be provided in the second groove.

By this configuration, since the switching element is at least partially embedded in the first groove and the first light-shielding film is formed in the second groove formed in the first groove, the switching element is surrounded from the lower side by the first light-shielding film in the second groove. Accordingly, the switching element can be sufficiently protected from incident oblique light, internal oblique reflected light or multiple reflected light according to the degree which surrounds the first light-shielding film from the lower side and reliability can be further improved.

In the invention, a radiation layer may be provided between the first light-shielding film and the switching elements.

By this configuration, since heat accumulated in the first light-shielding film can be prevented from being delivered to the switching element, it is possible to prevent the switching element from deteriorating and prevent malfunction from occurring. Accordingly, it is possible to provide a reliable liquid crystal device.

In the invention, a focusing unfit which focuses light incident from the first substrate to an opening region of the first light-shielding film may be provided at a light incident side of the first substrate.

By this configurations it is possible to prevent the aperture ration from being reduced due to the first light-shielding film and to realize bright display. In addition, since the light from the light source does not directly enter the switching element, it is possible to provide a reliable liquid crystal device.

In the invention, the liquid crystal device may further comprise a driving circuit unit for supplying an image signal whose polarity is inverted between a positive potential and a negative potential sequentially every unit period, to each of the plurality of data lines and supplying a plurality of pulse signals which rise at different timings to each of the plurality of scanning lines while skipping portions of the plurality of scanning lines may be included and, in any one horizontal driving period, the driving circuit unit may be driven such that the plurality of scanning lines to which a pulse signal which rises at a timing corresponding to a period for applying the positive potential of the image signal is supplied are adjacent to each other and the plurality of scanning lines to which a pulse signal which rises at a timing corresponding to a period for applying the negative potential is supplied are adjacent to each other.

In the driving circuit unit of the liquid crystal device, the image signal whose polarity is inverted sequentially every unit period is output to the data lines. For example, if the unit period is one horizontal period, the polarity inversion is performed by the same operation as that of the line inversion driving of the related art. With respect to the scanning lines, line sequential scanning is not performed from the upper side to the lower side of a screen, and scanning is performed over all the scanning lines while skipping portions (plural) of scanning lines. Any one of the pulse signal which rises at the timing corresponding to the period when the positive potential of the image signal is applied and the pulse signal which rises at the timing corresponding to the period when the negative potential is applied is supplied to each of the scanning lines.

At this time, in any one vertical period, since the plurality of scanning lines to which the pulse signal which rises at the timing corresponding to the period for applying the positive potential is supplied are adjacent to each other and the plurality of scanning lines to which the pulse signal which rises at the timing corresponding to the period for applying the negative potential is supplied are adjacent to each other, only any one of the pixel in which the positive potential is recorded and the pixel in which the negative potential is recorded exists in the region corresponding to the plurality of adjacent scanning lines. Accordingly, since a region to which the positive potential is applied and a region to which the negative potential is applied are formed in the screen with a predetermined width and inverted at a predetermined period, adjacent pixels have the same polarity in a specific region, similar to surface inversion driving.

However, in the invention, since the same operation as that of the line inversion driving of the related art is performed with respect to the data lines while the surface inversion driving is performed with respect to a specific region, there is no a difference in a temporal potential relationship between the pixel electrode and the data line in the upper pixels and the lower pixels of the screen as when driving is performed by the surface inversion method of the related art and thus display unevenness according to the location of the screen can be avoided while suppressing crosstalk. Since the adjacent pixels have the same polarity, it is possible to suppress crosstalk of the pixel boundary to improve contrast. Accordingly, the light-shielding film between the pixels is not significant compared with the liquid crystal device of the related art. Accordingly, in the invention, the light-shielding film formed on the second substrate may be omitted or simplified.

According to a further aspect of the invention, there is provided a projector comprising the liquid crystal device according to claim 1 as a spatial light modulation device.

By this configuration, it is possible to provide a projector which is capable of display an image having high display quality.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described. The embodiments detailed below are examples in which a liquid crystal device according to the invention is applied to a light valve (spatial light modulation device) of a projector having a high-brightness light source (250 lm).

First Embodiment

First, the configuration of a pixel unit of a liquid crystal device according to a first embodiment of the invention will be described.

Figure 1:
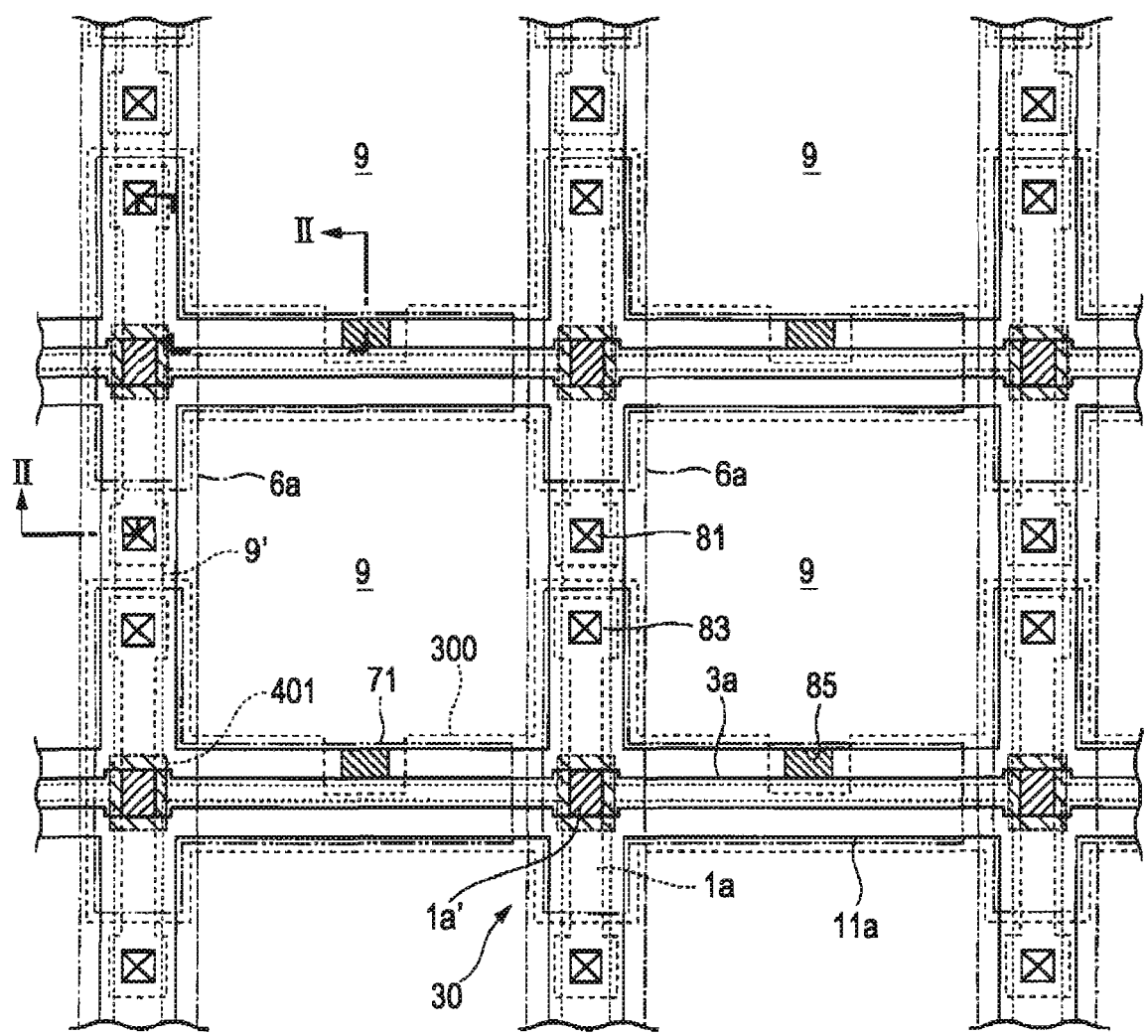
FIG. 1 is a plan view of a plurality of pixel regions provided in a liquid crystal device according to a first embodiment of the invention.
Figure 2:
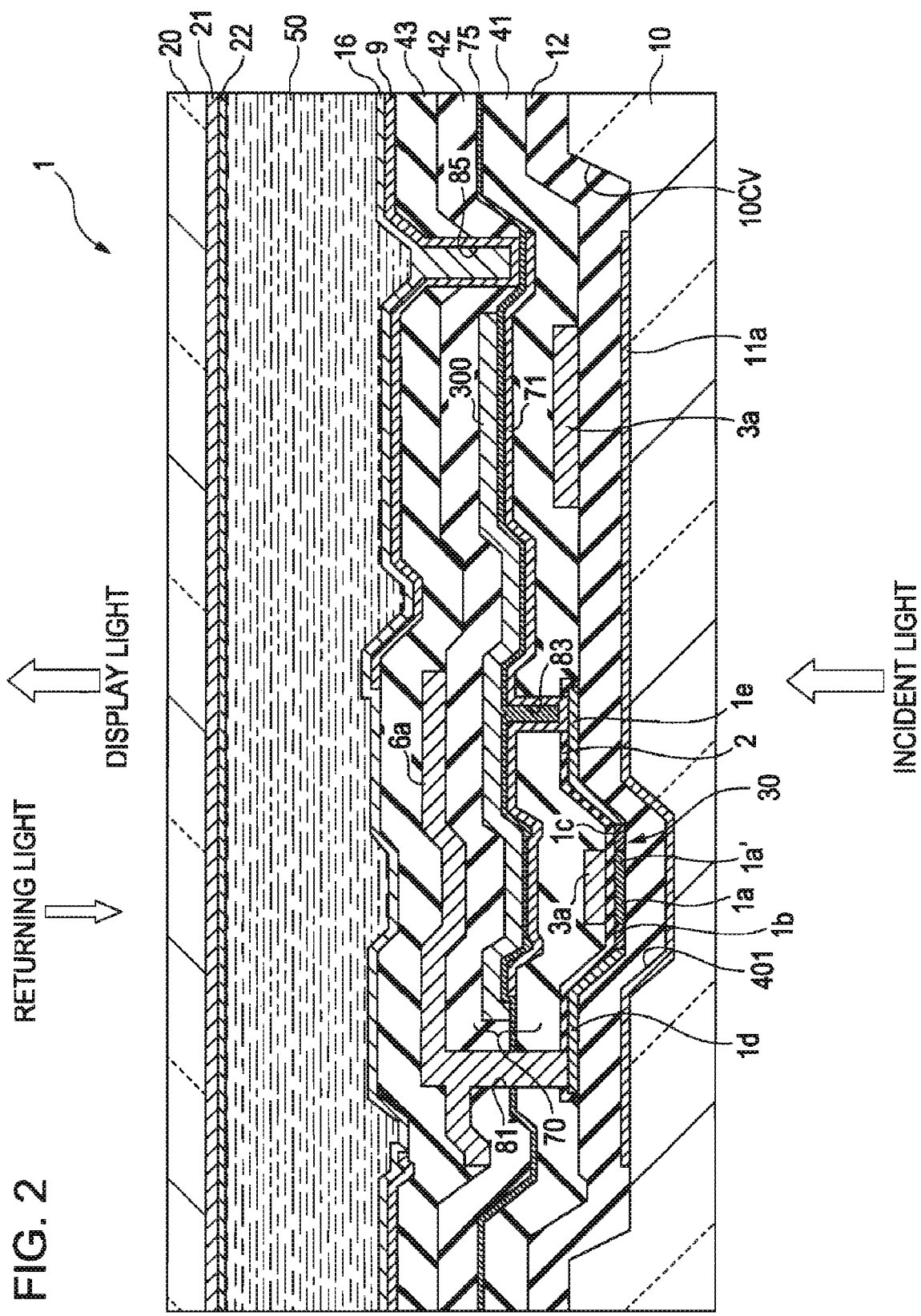
FIG. 2 is a cross-sectional view taken along line A-A' of FIG. 1.

FIG. 1 is a plan view of a plurality of pixel regions, which are disposed adjacent to one another, on a TFT array substrate on which data lines, scanning lines, and pixel electrodes are formed. FIG. 2 is a cross-sectional view of FIG. 1. In FIG. 2, the scale at which layers and members are drawn is different from that used in FIG. 1 different in order to enable easy recognition of recognize the layers and the members in the drawing.

As shown in FIG. 2, a plurality of transparent pixel electrodes 9 (indicated by dotted lines 9') is provided on the TFT array substrate (first substrate) of the liquid crystal device 1 in a matrix and data lines 6a and scanning lines 3a are provided along horizontal and vertical boundaries of the pixel electrodes 9.

Each of the scanning line 3a faces a channel region 1a' indicated by minute positive slope region and the scanning line 3a functions as a gate electrode. In particular, in the present embodiment, the scanning line 3a is formed so as to have a large width in a portion which functions as the gate electrode. At each of the points where the scanning lines 3a and the data lines 6a cross each other, a TFT 30 for switching the pixel in which the scanning line 3a facing the channel region 1a' as the gate electrode is provided.

As shown in FIGS. 1 and 2, a capacitance line 300 is formed on each of the scanning lines 3a. The capacitance line 300 includes a main line portion which extends in a stripe shape along the scanning line 3a in plan view and a protrusion portion which vertically protrudes from the main line portion along the data line 6a. The capacitance line 300 is, for example, formed of a metal silicide film including a high-melting point metal. The capacitance lines 300 may have a multi-layer structure in which a first film formed of a conductive polysilicon film and a second film formed of a metal silicide film including a high-melting point metal are laminated. The capacitance line 300 functions as a capacitance electrode of a fixed potential side of a storage capacitor 70 and also functions as an upper light-shielding film (second light-shielding film) for shielding the TFT 30 from returning light at the upper side (opposite side of the light incident side) of the TFT 30, in addition to the function of the capacitance line.

An intermediate layer 71 which faces the capacitance line 300 with a dielectric film 72 interposed therebetween functions as a capacitance electrode of a pixel potential side of the storage capacitor 70 and also functions as an intermediate conductive layer for connecting the pixel electrode 9 and a high-concentration drain region 1e of the TFT 30.

In the present embodiment, the storage capacitor 70 is formed by the intermediate layer 71, acting as the capacitance electrode of the pixel potential side connected to the pixel electrode 9 and the high-concentration drain region 1e of the TFT 30, and a portion of the capacitance line 300, acting as the capacitance electrode of the fixed potential side, with the dielectric film 75 interposed therebetween.

The upper light-shielding film having a lattice shape in plan view is formed above the TFT 30 on the TFT array substrate 10 and an opening region of each pixel is defined, by crossing the data line 6a which extends vertically in FIG. 1 and the capacitance line which extends horizontally in FIG. 1.

The lower light-shielding film (first light-shielding film) 11a having a lattice shape is provided below the TFT 30 on the TFT array substrate 10.

The capacitance line 300 which constitutes a portion of the upper light-shielding film and the lower light-shielding film 11a are, for example, formed of metal including at least one of high-melting point metals such as Ti, Cr, W, Ta, Mo and Pb, an alloy thereof, metal silicide or polysilicide or a lamination thereof. In the present embodiment, since the light emitted from a light source is input from the lower side (the side of the lower light-shielding film 11a) of the TFT 30, the thickness of the lower light-shielding film 11a should be sufficiently large. In order to have a sufficiently good light shielding function, it is preferable that the lower light-shielding film 11a is formed with, for examples a thickness in the range of 80 nm to 200 nm.

In FIG. 2, the dielectric film 75 interposed between the intermediate layer 71 and the capacitance 300, which functions as the capacitance electrode, is, for example, formed of a silicon oxide film or a silicon nitride film such as a relatively thin HTO film or LTO film having a thickness in the range of 5 to 200 nm. In view of increasing the capacitance of the storage capacitor 70, the dielectric film 75 is made as thin as possible while sufficiently retaining the reliability of the film.

As shown in FIGS. 1 and 2, each of the pixel electrodes 9 is electrically connected to the high-concentration drain region 1e of a semiconductor layer 1a with contact holes 83 and 85 interposed therebetween. When the intermediate layer 71 is used as an intermediate layer, an interlayer distance is, for example, as large as about 2000 nm, but a series of at least two contact holes each having a relatively small diameter can be used to connect the two sides, while avoiding difficulties in associated with a technology in which only one contact hole is used to connect the two sides. Accordingly, it is possible to increase a pixel aperture ratio and to prevent the shooting out of material during etching to form the contact hole.

Each of the data lines 6a is electrically connected to a high-concentration source region 1d of the semiconductor layer 1a formed of, for example, a polysilicon film with a contact hole 81 interposed therebetween. The data line 6a and the high-concentration source region 1a may be connected by an intermediate layer.

In each pixel region, the capacitance line 300 is provided so as to surround an image display region, in which the pixel electrode 9 is provided, and is electrically connected to a constant voltage source to have a fixed potential. The constant voltage source may be a positive or negative constant voltage source supplying a constant positive or negative voltage to a scanning line driving circuit described below) that supplies a scan signal for driving the TFT 30 to the scanning line 3a and a data line driving circuit (described below) for controlling a sampling circuit for supplying an image signal to the data line 6a or a constant voltage supplied to an opposite electrode 21 of the opposite substrate 20. The lower light-shielding film 11a may be provided so as to surround the image display region and be connected to a constant voltage source, similarly to the capacitance line 300, in order to prevent variations in voltage from having a negative influence on the TFT 30.

In FIGS. 1 and 2, the liquid crystal device 1 has the transparent TFT array substrate 10 and a transparent opposite substrate 20, which face each other. The TFT array substrate 10 and the opposite substrate 20 are, for example, formed of a transparent material such as a glass or quartz.

Although not shown in FIG. 1, a lattice-shaped groove (first groove) 10cv having dimensions slightly larger than those of the lower light-shielding film is formed in the TFT array substrate 10, as shown in FIG. 2. The wirings or the elements such as the scanning line 3a, the data line 6a and the TFT 30 are embedded in the groove 10cv. Accordingly, a step difference between a region in which the wirings and the elements are disposed and a region in which the wirings and the elements are not disposed is reduced and thus image failure due to a problem such as an alignment failure of limpid crystal due to the step difference can be reduced.

In the present embodiment, a concave portion (second groove) 401 having an island shape is formed in the bottom of the groove 10cv at a position facing the channel region 1a' and a region adjacent thereto. The configuration and the effect of the concave portion 401 will be described later in detail with reference to FIGS. 3 to 5, together with a light shielding function.

As shown in FIG. 2, the pixel electrode 9 is provided on the TFT array substrate 10 and an alignment film 16, which has been subjected to a certain alignment treatment such as rubbing treatment, is provided thereon. The pixel electrode 9 is, for example, formed of a transparent conductive film such as indium tin oxide (ITO) film. Alternatively, the alignment film 16 may be, for example, an organic film such as a polyimide film.

The opposite electrode 21 is provided over the entire surface of the opposite substrate (second substrate) 20 and an alignment film 22, which has been subjected to a certain alignment treatment such as a rubbing treatment, is provided below the opposite electrode. The opposite electrode 21 is, for example, formed of a transparent conductive film such as an ITO film. Alternatively, the alignment film 22 may be an organic film such as a polyimide film. These members are formed of materials (transparent layer) each having sufficient transmittance with respect to the light emitted from the light source to archive desired display characteristics. Several members (not shown) may be provided on the opposite substrate 20 and have sufficient transmittances. In addition, the light-shielding film provided on the TFT array substrate 10 is omitted in the boundary of each pixel and at least a portion corresponding to the image display region in the opposite substrate 20 is formed of transparent layers such as the glass substrate, the opposite electrode 21, and the alignment film 22.

The term "sufficient transmittance" indicates that the transmittance is sufficient (for example, light transmittance of at least 50%) with respect to the light of a wavelength used in the display For example, when a color filter is provided on the opposite substrate 20, transmittance is sufficient with respect to color light which is transmitted through the color filter, but need not be sufficient with respect to light of the other color.

Liquid crystal which is an electro-optical material is filled in a space between the TFT array substrate 10 and the opposite substrate 20, which are disposed such that the pixel electrode 9 and the opposite electrode 21 face each other, surrounded by a sealing material described below to form a liquid crystal layer 50. The liquid crystal layer 50 is made to being a predetermined alignment state by the alignment films 16 and 22 when an electric field is not being applied from the pixel electrode 9. The liquid crystal layer 50 is, for example, one kind of nematic liquid crystal or a combination of various kinds of nematic liquid crystal. The sealing material is an adhesive which adheres the TFT array substrate 10 to the opposite substrate 20 at the peripheries thereof and is made of, for example, photocurable resin or thermosetting resin, and is mixed with a gap material for maintaining a predetermined distance between the substrates, such as glass fiber or glass beads.

An underlying insulating film 12 is provided below the TFTs 30 for switching the pixels. The underlying insulating film 12 has a Function of providing interlayer insulation between the TFT 30 and the lower light-shielding film 11a and a function for preventing the pixel-switching characteristic of the TFT 30 from deteriorating due to contamination after cleaning or surface roughness at the time of polishing the surface of the TFT array substrate 10 since the underlying insulating film is formed on the TFT array substrate 10.

In FIG. 2, the TFT 30 for switching the pixel has a lightly doped drain (LDD) structure and has the scanning line 3a, the channel region 1a' of the semiconductor layer la in which a channel is formed by the electric field from the scanning line 3a, the insulating film 2 including a gate insulating film for insulating the scanning line 3a and the semiconductor layer 1a, a low-concentration source region 1b and a low-concentration drain region 1c of the semiconductor layer 1a, and the high-concentration source region 1d and the high-concentration drain region 1e of the semiconductor layer 1a.

A first interlayer insulating film 41 in which a contact hole 81 connected to the high-concentration source region 1d and a contact hole 83 connected to the high-concentration drain region 1e are formed is formed on the scanning line 3a.

The intermediate layer 71 and the capacitance line 300 are formed on the first interlayer film 41 and a second interlayer insulating film 42 in which the contact hole 81 and the contact hole 85 are formed is formed thereon.

The data line 6a is formed on the second interlayer insulating film 42 and a third interlayer insulating film 43 in which the contact hole 85 connected to the intermediate layer 71 is formed is formed thereon. The pixel electrode 9 is formed on the surface of the third interlayer insulating film 43.

Figure 3:
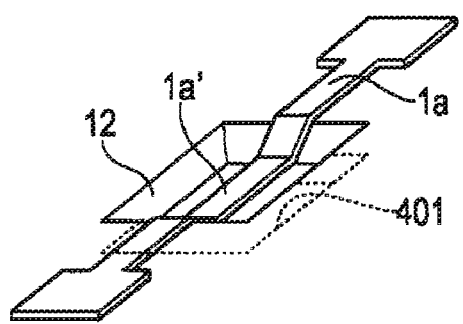
FIG. 3 is a partial enlarged perspective view showing a semiconductor layer provided on a concave portion.
Figure 4:
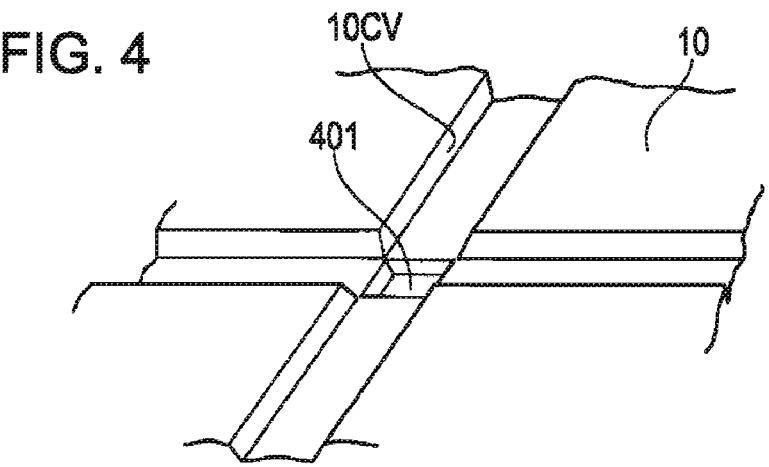
FIG. 4 is a partial enlarged perspective view showing an upper surface of a substrate in which a groove and a concave portion are formed.
Figure 5:
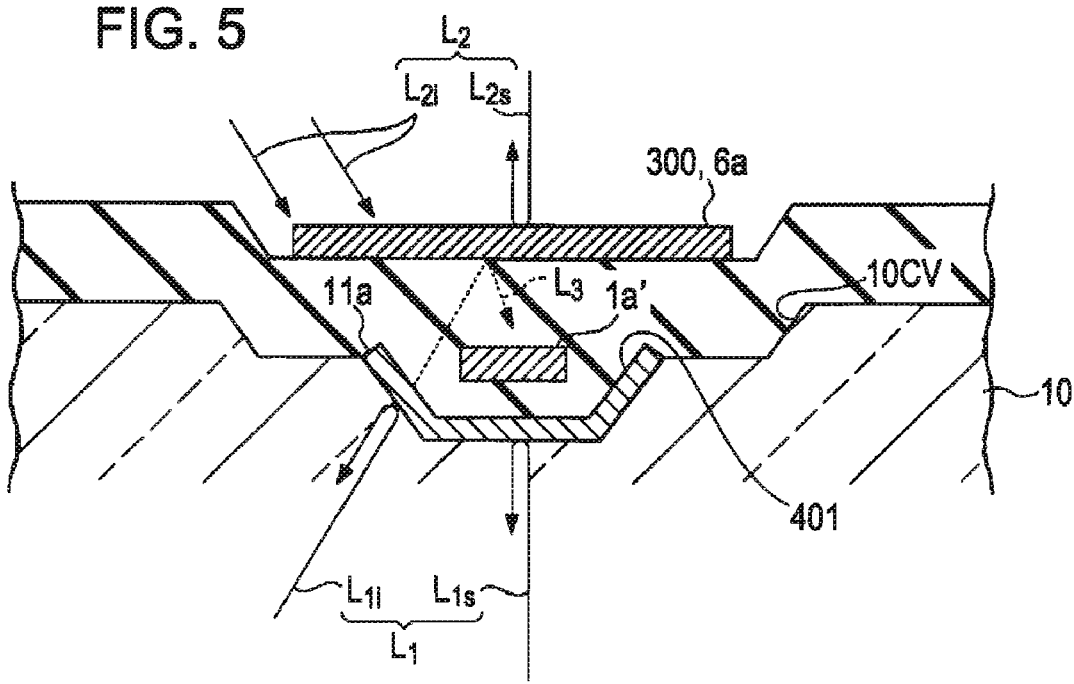
FIG. 5 is a schematic pseudo cross-sectional view two-dimensionally showing upper and lower light-shielding films and the concave portion of the substrate.

Next, the configuration of the groove 10cv of an example of the first groove and the concave portion 401 of an example of the second groove, both which are formed in the substrate 10, and the light shielding function according to the present embodiment will be described in detail with reference to FIGS. 3 to 5. FIG. 3 is a partial enlarged perspective view showing the underlying insulating film 12 formed on the concave portion 401 and the semiconductor layer 1a formed thereon. FIG. 4 is a partial enlarged perspective view showing the upper surface of the substrate 10 in which the groove 10cv and the concave portion 401 are formed. FIG. 5 is a schematic pseudo cross-sectional view two-dimensionally showing the light shielding function using the upper light-shielding film (the capacitance line 300 and the data line 6a) and the lower light-shielding film 11a above and below the channel region 1a' of the TFT 30 in the basic configuration of the above embodiment. The actual shape and arrangement of the films or the concave portion shown in FIG. 5 are three dimensional and more complicated than those shown in FIG. 5. However, a relationship between light shielding functions shielding the vicinity of the channel region 1a' from the incident light and the returning light is schematically shown. In FIG. 5, a relationship between the incident light and the returning light and the channel region 1a and the upper and lower light-shielding films extracted from the lamination structure on the substrate 10 is shown.

As shown in FIGS. 3 and 4 and FIGS. 1 and 2 described above, in the present embodiment, in a region facing at least the channel region 1a' of the semiconductor layer 1a, the concave portion 401 having the island shape is formed in the substrate 10. The concave portion 401 is provided in the groove 10cv formed in the lattice shape along the scanning line 3a and the data line 6a and positioned on the intersection between the scanning line 3a and the data line 6a.

According to the present embodiment, since the channel region 1a' and the low-concentration source region 1b and the low-concentration drain region 1c (see FIG. 2) adjacent thereto are covered by the lower light-shielding film 11a from the bottom, as shown in FIG. 5, the shielding against incident light L1 including incident light L1s in a direction normal to the substrate 10 and oblique incident light L1i is sufficiently improved by the lower light-shielding film 11a. Since the channel region 1a' and the low-concentration source region 1b and the low-concentration drain region 1c (see FIG. 2) adjacent thereto are covered by the capacitance line 300 and the data line 6a, both which form the upper light-shielding film, from the top, as shown in FIG. 5, the shielding against the light reflected from the rear surface of the substrate 10 and the returning light L2 such as light which is emitted from other liquid crystal devices and penetrates through a synthetic optical system in a double-plate type projector using a plurality of liquid crystal devise as a light valve is sufficiently improved by the capacitance line 300 and the data line 6a both which function as the upper light-shielding film.

As shown in FIG. 5, the incident light L1 and the returning light L2 include oblique light L1i and L2i which are input in a direction oblique to the substrate 10, respectively. For example, a component of which an incident angle of 10 to 15 degrees relative to the vertical direction is included.

Accordingly, with respect to the oblique light L1i, in the present embodiment, the concave portion 401 is provided below the lower light-shielding film 11a and the lower light-shielding film 11a is formed in the concave portion 401 such that the channel region 1a' is included in a space surrounded by the lower light-shielding film 401 to some extent with the underlying insulating film 12 interposed therebetween. With this configuration, the reflected oblique light L3 (indicated by a dotted line in FIG. 5) can be prevented from being generated as a result of the incident oblique light L1i reaching the channel region 1a. In particular, in the present embodiment, the lower light-shielding film 11a is formed on the sidewall of the concave portion 401 and the edge of the lower light-shielding film 11a is partially identical to the edge of the concave portion 401 on the substrate 10 (see FIG. 5). Accordingly, it is possible to efficiently shield the light over the whole channel region la, and to efficiently prevent the returning light L2i which is obliquely input from being reflected from the upper surface of the lower light-shielding film, which is outside the concave portion 401, from reaching the upper space of the concave portion 401.

With respect to the returning light L2i which is obliquely input, in the present embodiment, the widths of the capacitance line 300 and the data line 6a both which act as the upper light-shielding film are slightly larger that of the lower light-shielding film 11a such that the returning light L2i which escapes from the side of the upper light-shielding film is prevented from being reflected from the upper surface of the lower light-shielding film 11a formed on the substrate 10 and reaching the channel region 1a'.

As described above, according to the liquid crystal device according to the present embodiment, it is possible to obtain high light shielding performance with respect to the incident light L1 and the returning light L1. Since the light is blocked using only the light-shielding film of the TFT array substrate and the light-shielding film of the opposite substrate is omitted, surface roughness does not occur at the time of displaying a moving image and thus an image having high display quality can be displayed. When the light-shielding film of the opposite substrate (light emitting side) is omitted, contrast may deteriorate due to discrination between pixels. However, in the present embodiment, as described below, since region inversion driving is employed as a driving method, the discrination between the pixels hardly occurs. Accordingly, display having high brightness and high contrast is possible.

According to the present embodiment, in each of the pixel regions, since the TFT 30, the scanning line 3a, the data line 6a and the capacitance line 300 are disposed in the groove 10cv with the interlayer insulating film interposed therebetween, it is possible to reduce a step difference in the surface of the third interlayer insulating film 43, which is the underlying surface of the pixel electrode 9, due to the TFT 30, the scanning line 3a, the data line 6a and the capacitance line 300. Particularly, since the TFT 30, the scanning line 3a, the data line 6a and the capacitance line 300 overlap and the concave portion 401 is formed in a region of which the thickness of the lamination on the substrate 10 is largest, it is possible to efficiently reduce the step difference. As a result, it is possible to reduce an alignment failure of the liquid crystal due to the step difference.

From this viewpoint, the depth of the concave portion 401 is, for example, several hundreds to several thousands of nm. Since the concave portion 401 can be formed by etching after forming the groove 10cv in the substrate 10 by etching, a manufacturing process is easily performed. The sidewall of the concave portion 401 is tapered to be angled at 45 degrees to 80 degrees such that the oblique light L2i which reaches the lower light-shielding film 11a formed on the sidewall of the concave portion 401 is reflected in a direction deviated from the channel region 1a' according to the kind of the light of the light source and the region in which the upper light-shielding film is formed.

In the above-described embodiment, as shown in FIG. 2, although the step difference which occurs in the region along the data line 6a or the scanning line 3a on the underlying surface of the pixel electrode 9 (that is, the surface of the third interlayer insulating film 43) by laminating the plurality of conductive layers is reduced by forming the groove 10cv and the concave portion 401 in the TFT array substrate 10, a planarization process may be performed by forming a groove in the underlying insulating film 12, the first interlayer insulating film 41, the second interlayer insulating film 42, and the third interlayer insulating film 43 and embedding the wirings such as data line 6a and so on and the TFT 30 or a planarization process may be performed by polishing the step difference of the surface of the third interlayer insulating film 43 or the second interlayer insulating film 42 by a chemical mechanical polishing (CMP) process or evenly forming an organic spin-on-glass (SOG) film.

In the above-described embodiment, although each of the TFTs 30 for switching the pixels has the LDD structure as shown in FIG. 2, the TFT 30 may have an offset structure in which impurities are not injected into the low-concentration source region 1b and the low-concentration drain region 1c or be a self-alignment type TFT in which high-concentration source and drain regions are formed in a self-aligning structure by injecting impurities with high concentration using the gate electrode formed of a portion of the scanning line 3a as a mask may be used. In the present embodiment, although a single gate structure in which one gate electrode of the TFT 30 for switching the pixel is interposed between the high-concentration source region 1d and the high-concentration drain region 1e is employed, at least two gate electrodes may be interposed therebetween. When the TFT has a dual gate structure or a triple gate structure, leakage current due to the adhesion between the channel and the source and drain regions can be prevented and thus the flow of current upon turn-off can be reduced.

In the present embodiment, the channel region 1a' of the TFT 30 is doubly protected by the lower light-shielding film 11a and the upper light-shielding film 6a and 300. However, since the upper side of the channel region 1a' is covered by the gate electrode 3a in a top gate type TFT 30, only the light can be sufficiently blocked using the gate electrode 3a and thus the upper light-shielding film 6a and 300 may be omitted.

Second Embodiment

Figure 6:
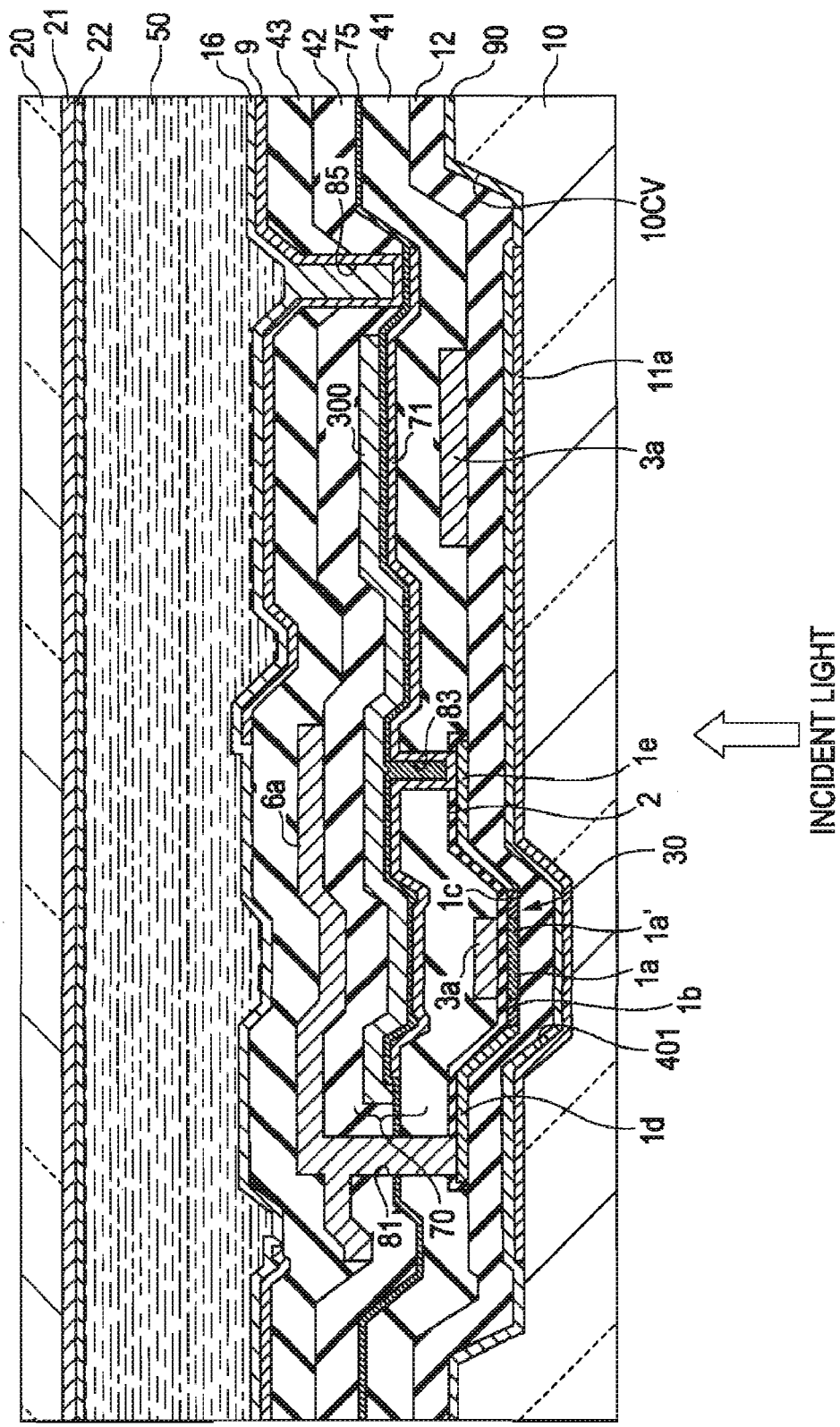
FIG. 6 is a cross-sectional view of a liquid crystal device according to a second embodiment of the invention.

Next, a liquid crystal device according to a second embodiment of the invention will be described with reference to FIG. 6.

The basic configuration of the liquid crystal device according to the present embodiment is identical to that of the first embodiment except that a radiation layer 90 is interposed between the TFT 30 and the lower light-shielding film 11a of the TFT array substrate 10. Accordingly, in the present embodiment, the function of the radiation layer will be described using FIG. 6 and the description for the common parts will be omitted.

The radiation layer 90 is formed on the surface of the lower light-shielding film 11a. As a material of the radiation layer 90, a diamond like carbon (DLC), Al or Ni or the like is suitable and the thickness there of is about 5 nm. The radiation layer 90 has a function for absorbing and radiating heat accumulated in the lower light-shielding film 11a to the outside of the TFT array substrate 10. Accordingly, the heat accumulated in the lower light-shielding film 11a is not delivered to the TFT 30 and thus the TFT 30 is prevented from deteriorating due to heat. Since the heat is not accumulated in the lower light-shielding film 11a, it is possible to the lower light-shielding film from deteriorating due to heat. In this case, the thickness of the lower light-shielding film 11a can be smaller than that of the lower light-shielding film in the case where the radiation layer 90 is not provided and thus reduced to about 50 nm to 120 nm.

Third Embodiment

Next, a liquid crystal device according to a third embodiment of the invention will be described with reference to FIG. 7.

The basic configuration of the liquid crystal device according to the present embodiment is identical to that of the first embodiment, except that a microlens which is focusing means is provided at the light incident side of the TFT array substrate 10. Accordingly, in the present embodiment, only the configuration and the operation of the microlens will be described using FIG. 7 and the description or the common parts will be omitted.

Figure 7:
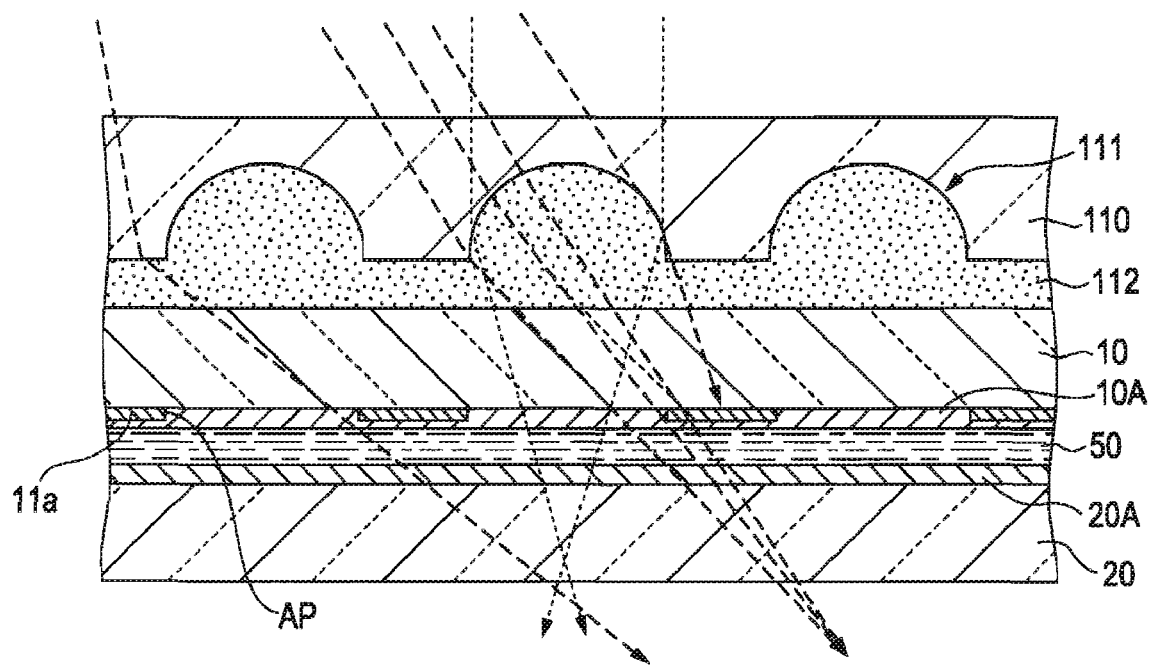
FIG. 7 is a cross-sectional view of a liquid crystal device according to a third embodiment of the invention.

As shown in FIG. 7, a microlens array substrate 110 is provided at the light incident side of the TFT array substrate 10. The microlens array substrate 110 is attached to the upper surface of the TFT array substrate 10 with an adhesive layer 112 interposed therebetween. A plurality of concave curved portions is formed in the microlens array substrate 110 at the side of the TFT array substrate 10 and a microlens 111 which is a lens element (refracting optical element) is formed by the optically transparent adhesive layer 112 disposed in the concave curved portions. In addition, the concave curved portion has a semi-spherical shape and the concave bottom thereof is curved. The concave curved portion functions as a refractive surface for refracting the light incident from the light source. The shape of the microlens 111, the refractive index of the microlens array substrate 110 and the refractive index of the adhesive layer 112 are properly set such that the refractive light efficiently passes through an opening region of the lower light-shielding film 11a.

The lattice-shaped lower light-shielding film 11a is provided on the TFT array substrate 10. The lower light-shielding film 11a has a plurality of opening regions AP corresponding to the pixels. One microlens 111 is provided in correspondence with one opening region AP. Each microlens 111 functions as focusing means for focusing the light incident from the light source to the corresponding opening region AP. That is, the light incident from the light source is refracted according to the refractive index difference between the microlens array substrate 110 and the adhesive layer 112 and focused to the opening region AP of the lower light-shielding film 11a. In the whole liquid crystal device, the plurality of microlenses 111 provided in correspondence with the plurality of opening regions AP are arranged in the plane to configure a microlens array.

A reference numeral 10A of FIG. 7 denotes a circuit layer including a variety of elements, wiring and alignment films in the plurality of pixels. The TFT which is the pixel switching element is provided at a position which overlaps the lower light-shielding film 11a in a plane.

According to this configuration, the aperture ratio is prevented from being reduced due to the lower light-shielding film 11a and thus brightness display can be realized. Since the light from the light source does not directly enter the TFT, a reliable liquid crystal device is provided. The light which is input in a direction oblique to an optical axis transmits through the opposite substrate 20 facing the light-shielding film 11a and is efficiently used as image light. As a result, a lattice-shaped image formed by lattice-shaped shadow of the light-shielding film 11a is avoided and thus a seamless image can be provided with low cost.

Fourth Embodiment

Next, a liquid crystal device according to a fourth embodiment of the invention will be described in detail with reference to FIG. 8.

The basic configuration of the liquid crystal device according to the present embodiment is identical to those of the first embodiment and the third embodiment except that a prism element which is focusing means is provided at the light incident side of the TFT array substrate 10. Accordingly, in the present embodiment, the configuration and the operation of the prism element will be described using FIG. 8 and the description for the common parts will be omitted.

Figure 8:
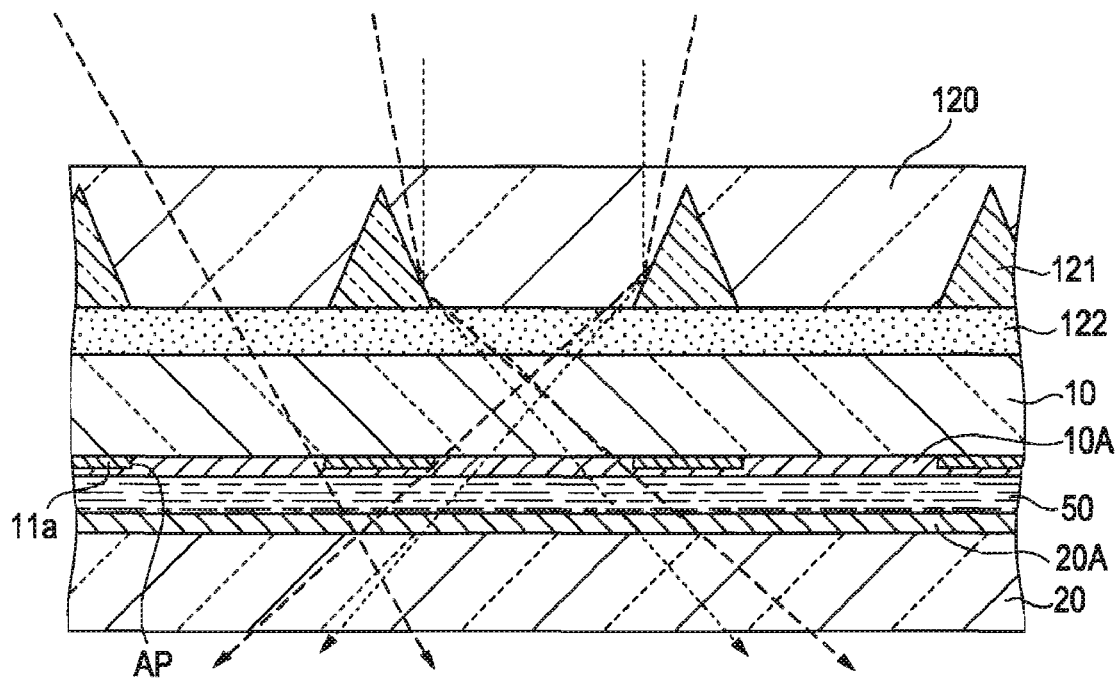
FIG. 8 is a cross-sectional view of a liquid crystal device according to a fourth embodiment of the invention.

As shown in FIG. 8, a prism array substrate 120 is provided at the light incident side of the TFT array substrate 10. The prism array substrate 120 is attached to the upper surface of the TFT array substrate 10 with an adhesive layer 122 interposed therebetween. A plurality of concave portions is formed in the prism array substrate 120 at the side of the TFT array substrate 10 and a prism element 121 is formed by the optically transparent adhesive layer 122 filled in the concave portions. In addition, the concave portion has an oblique surface which is oblique at a predetermined angle with respect to the optical axis. The concave portion functions as a reflective surface for reflecting the light incident from the light source.

The lattice-shaped lower light-shielding film 11a is provided on the TFT array substrate 10. The lower light-shielding film 11a has a plurality of opening regions AP corresponding to the pixels. One prism element 121 is provided in correspondence with one opening region AP. Each prism element 121 functions as focusing means for focusing the light incident from the light source to the corresponding opening region AP. That is, the light incident from the light source is total-reflected from the concave surface (reflective surface) of the prism element 121 according to the refractive index difference between the prism array substrate 120 and the adhesive layer 122 and focused to the opening region AP of the lower light-shielding film 11a. In the whole liquid crystal device, the plurality of prism elements 121 provided in correspondence with the plurality of opening regions AP are arranged in the plane to configure a prism group.

According to this configuration, the aperture ratio is prevented from being reduced due to the lower light-shielding film 11a and thus brightness display can be realized. Since the light from the light source does not directly enter the TFT, a reliable liquid crystal device is provided. The light which is input in a direction oblique to an optical axis transmits through the opposite substrate 20 facing the light-shielding film 11a and is efficiently used as image light. As a result, a lattice-shaped image formed by lattice-shaped shadow of the light-shielding film 11a is avoided and thus a seamless image can be provided with low cost. In the focusing means (prism array) having no focus, a light beam ratio of the incident oblique beam passing through the region of the opposite substrate 20 increases and thus the brightness of the region of the light-shielding film 11a is improved. Accordingly, it is possible to obtain an excellent seamless in the whole screen.

Fifth Embodiment

Next, a liquid crystal device according to a fifth embodiment of the invention will be described with reference to FIGS. 9 and 10.

The basic configuration of the liquid crystal device according to the present embodiment is identical to those of the first embodiment and the third embodiment except that a light-shielding film is provided on the opposite substrate. In the present embodiment, the configuration and the operation of the light-shielding film of the opposite substrate will be described using FIGS. 9 and 10 and the description for the common parts will be omitted.

Figure 9:
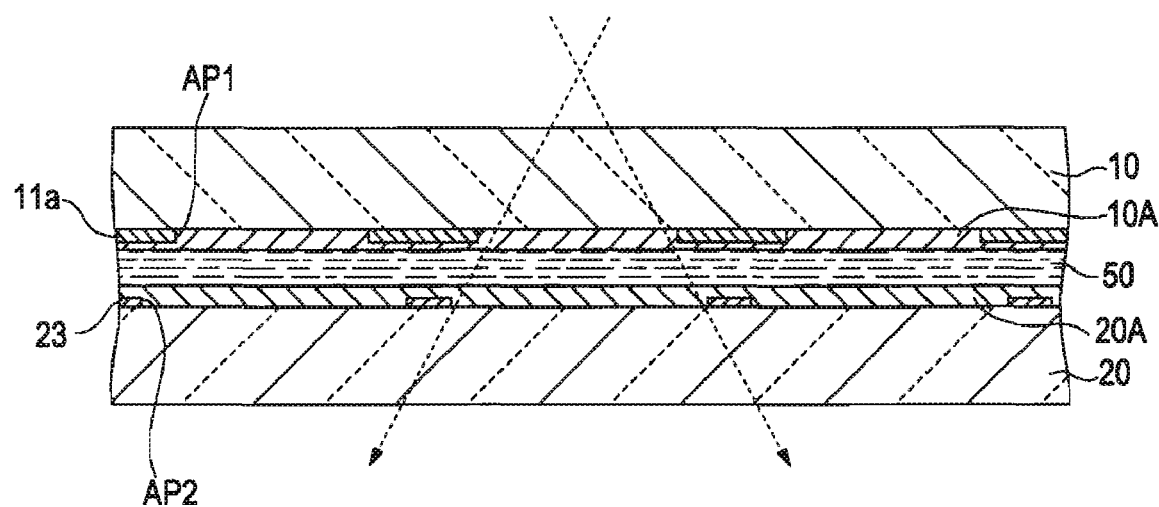
FIG. 9 is a cross-sectional view of a liquid crystal device according to a fifth embodiment of the invention.

As shown in FIG. 9, a lattice-shaped light-shielding film (the light-shielding film of the opposite substrate side) 23 is provided on the surface of the liquid crystal layer side of the opposite substrate 20. The light-shielding film 23 of the opposite substrate side has a plurality of opening regions AP2 corresponding to the pixels. The plurality of opening regions AP2 corresponds to the plurality of opening regions AP1 provided on the lower light-shielding film 11a of the TFT array substrate 10, respectively. The light-shielding film 23 of the opposite substrate side suppresses an unstable operation of the TFT due to the returning light, together with the upper light-shielding film of the TFT array substrate 10. The light-shielding film 23 also has a function for absorbing the necessary returning light to suppress the temperature of the alignment film 20A from increasing.

Figure 10A:
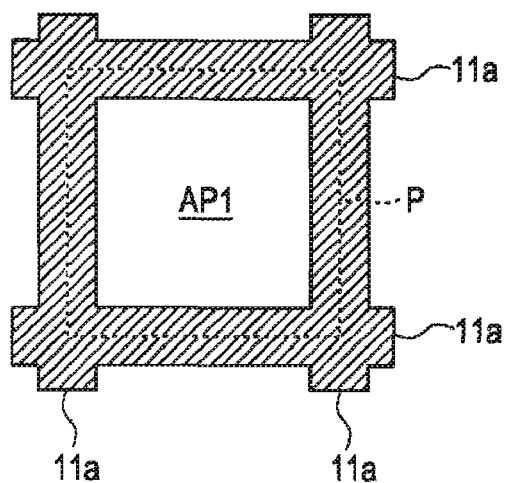
FIG. 10 is a plan view of a light-shielding film provided in the liquid crystal device.
Figure 10B:
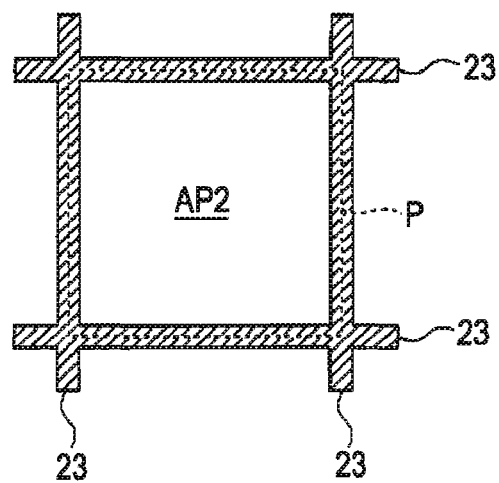

FIG. 10 is a view showing the planar structure of the lower light-shielding film 11a and the light-shielding film 23 of the opposite substrate side.

As shown in FIG. 10, the lower light-shielding film 11a and the light-shielding film 23 of the opposite substrate side are provided along the circumferences of the pixels P in a lattice shape. The width in the vertical direction (direction parallel to the data line) and the width in the horizontal direction (direction parallel to the scanning line) of the light-shielding film 23 of the opposite substrate side are smaller than those of the lower light-shielding film 11a. Accordingly, the aperture ratio E2(%) of the light-shielding film 23 of the opposite substrate side and the aperture ration E1(%) of the lower light-shielding film 11a satisfy a relationship of E1<E2. By increasing the opening region AP2 of the light-shielding film 23 of the opposite substrate side, it is possible to use the incident oblique light as display light without shielding light by the light-shielding film 23 of the opposite substrate side and to improve light use efficiency.

It is preferable that the level of the aperture ratio E2 of the light-shielding film 23 of the opposite substrate side is in a range of E1×1.1(%)<E2(%)<90(%). If E1×1.1(%)≧E2(%), the incident oblique light cannot be sufficiently used and If E2(%)≧90(%), it is possible to ensure light use efficiency while realizing a stable operation of the TFT and the endurance insurance.

In this configuration, since the light-shielding film 23 is provided on the opposite substrate 20, display slightly darker than that of the first embodiment is obtained. However, since the aperture ratio of the light-shielding film 23 of the opposite substrate side is larger than that of the light-shielding film 11a of the TFT array substrate side, the brightness reduction is suppressed to a minimum. Since the opening region AP2 of the light-shielding film 23 is larger than that of the opening region AP1 of the light-shielding film 11a, it is possible to efficiently use the incident light which is input in the direction oblique to the optical axis as image light and to reduce the lattice-shaped image formed by the light-shielding film 23 to provide a seamless image with low cost.

Whole Configuration of Liquid Crystal Device

Next, the whole configuration of the liquid crystal device according to the invention will be described.

Figure 11:
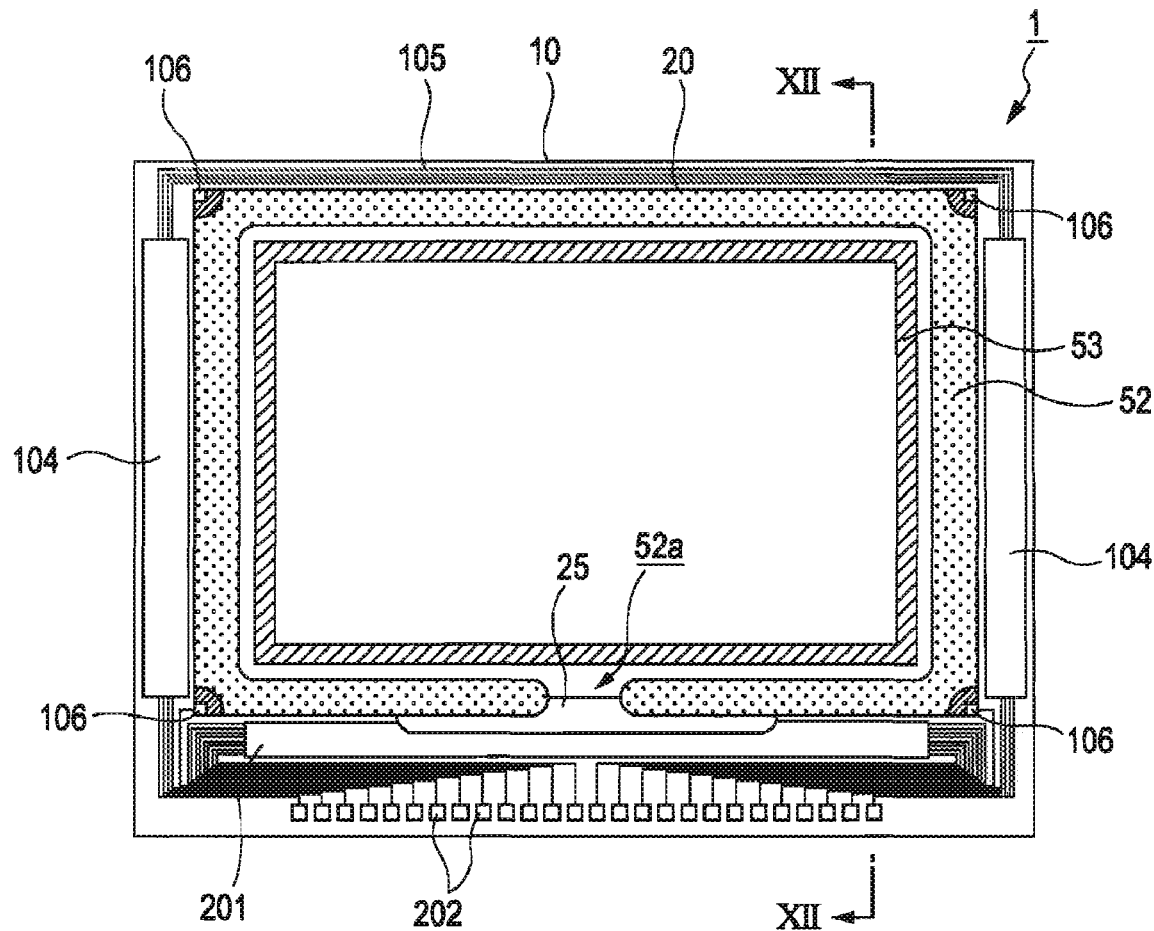
FIG. 11 is a schematic plan view showing the configuration of the liquid crystal device according to the invention.
Figure 12:
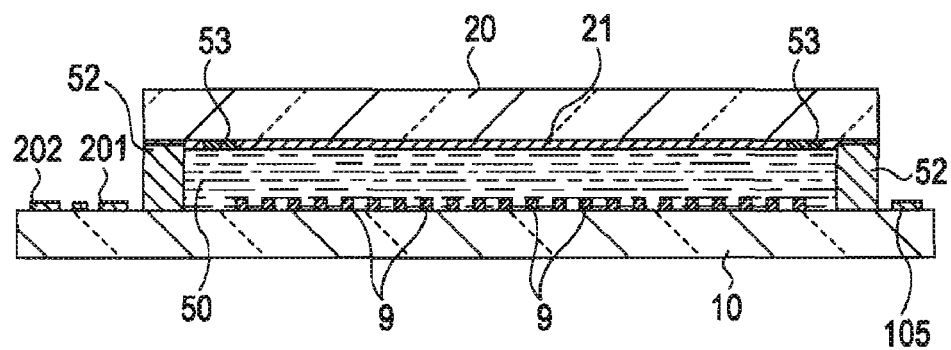
FIG. 12 is a cross-sectional view taken along line H-H' of FIG. 11.
Figure 13:
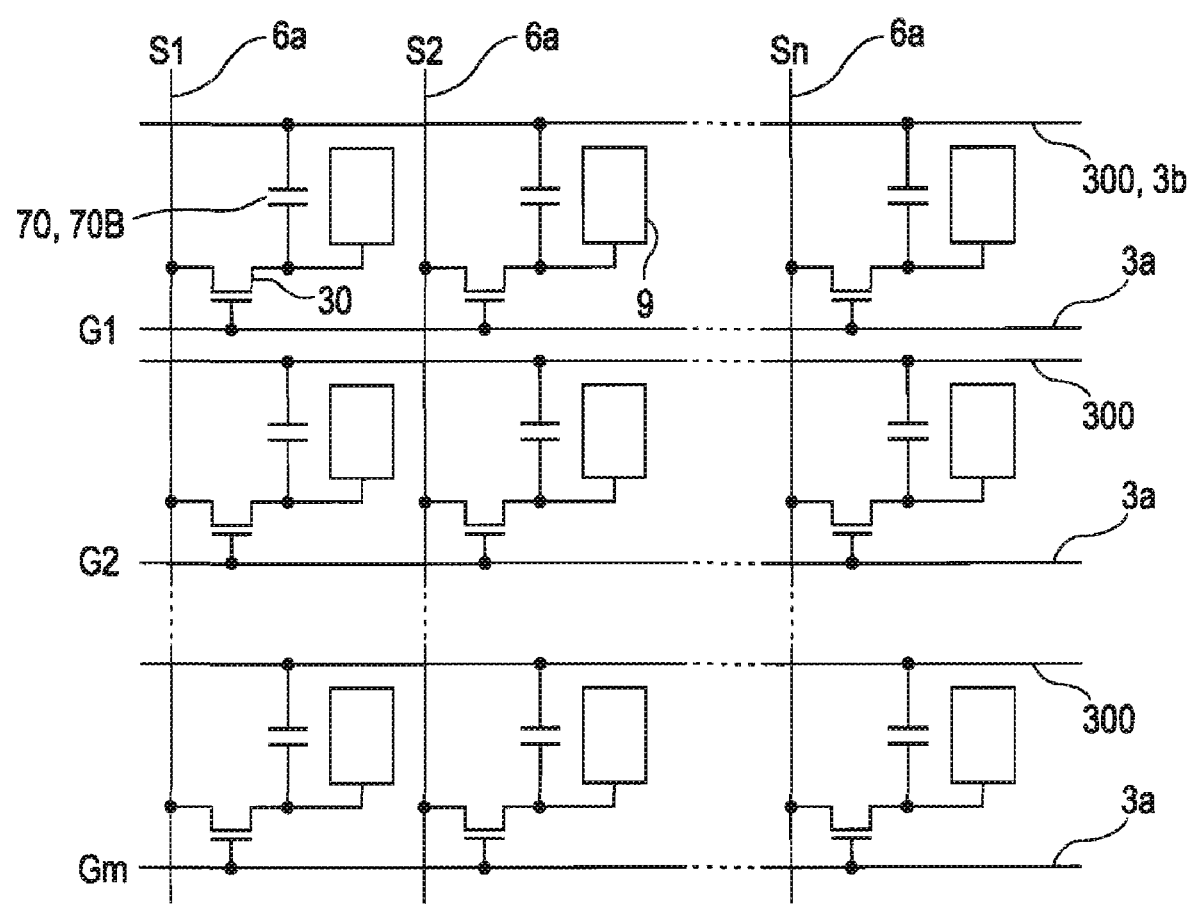
FIG. 13 is an equivalent circuit diagram of a plurality of pixels formed in a matrix.
Figure 14:
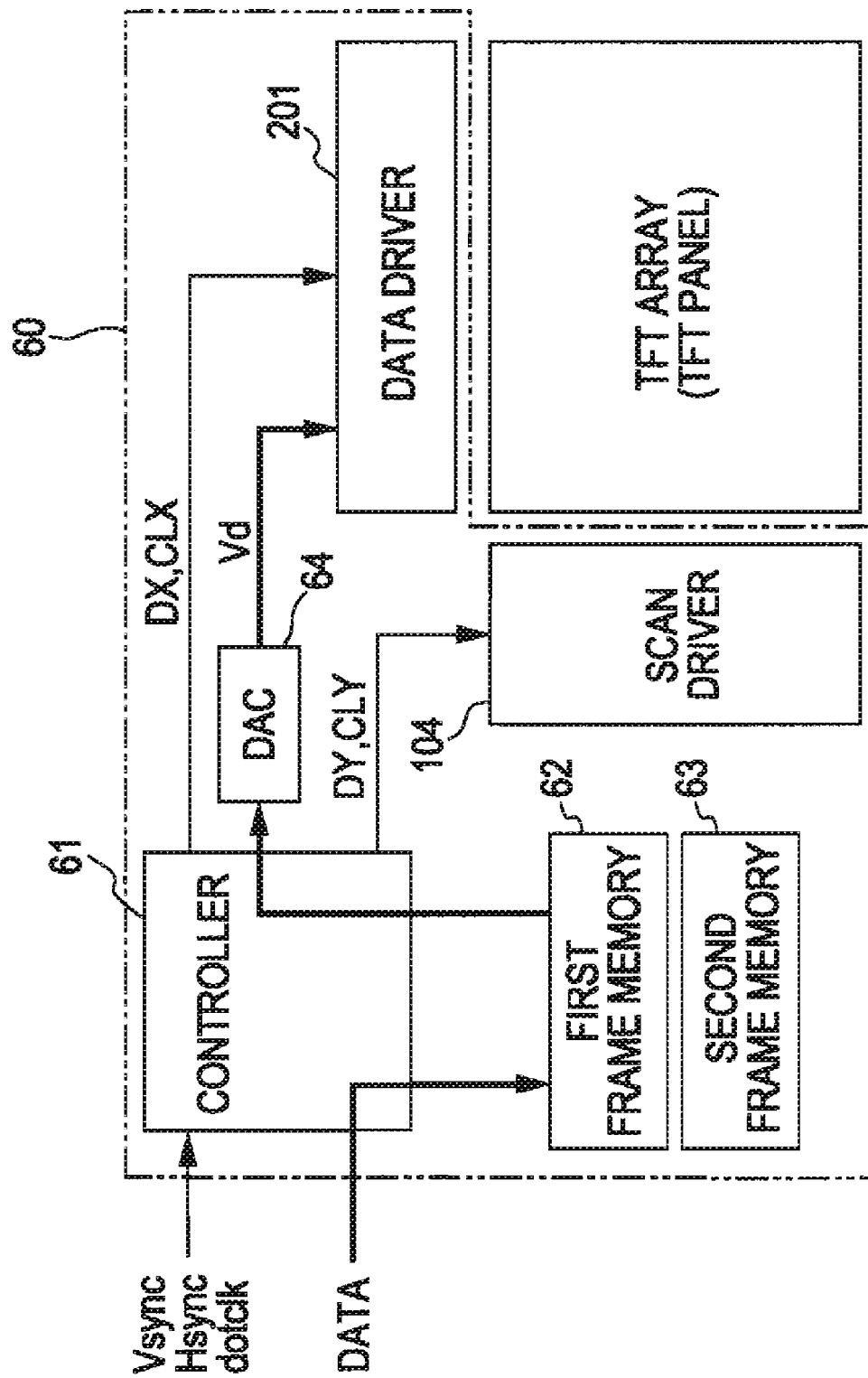
FIG. 14 is a block diagram showing a driving circuit unit of the liquid crystal device.
Figure 15:
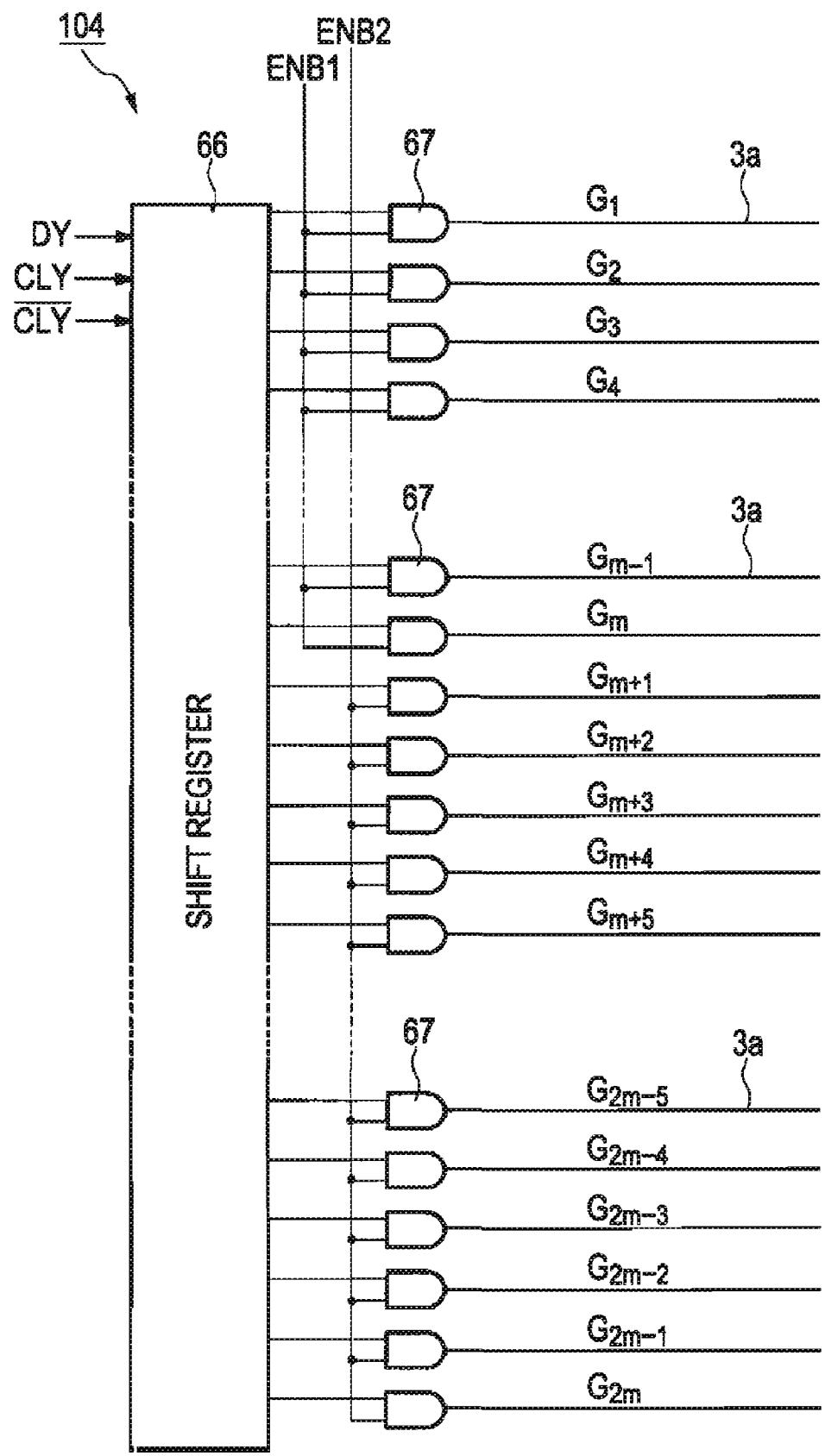
FIG. 15 is a circuit diagram showing the configuration of a scan driver in the driving circuit unit.
Figure 16:
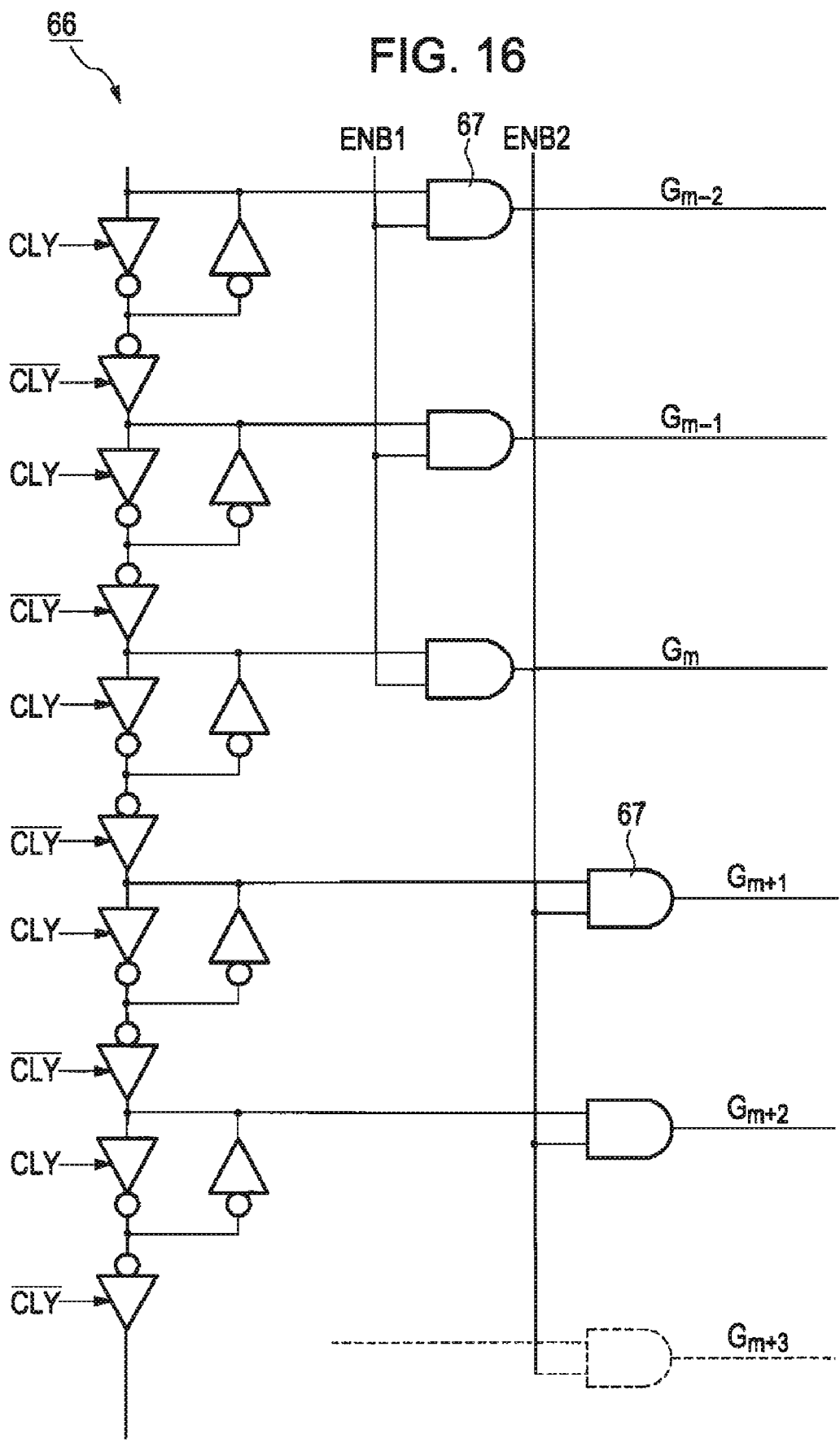
FIG. 16 is a detailed circuit diagram of main units of FIG. 15.
Figure 17:
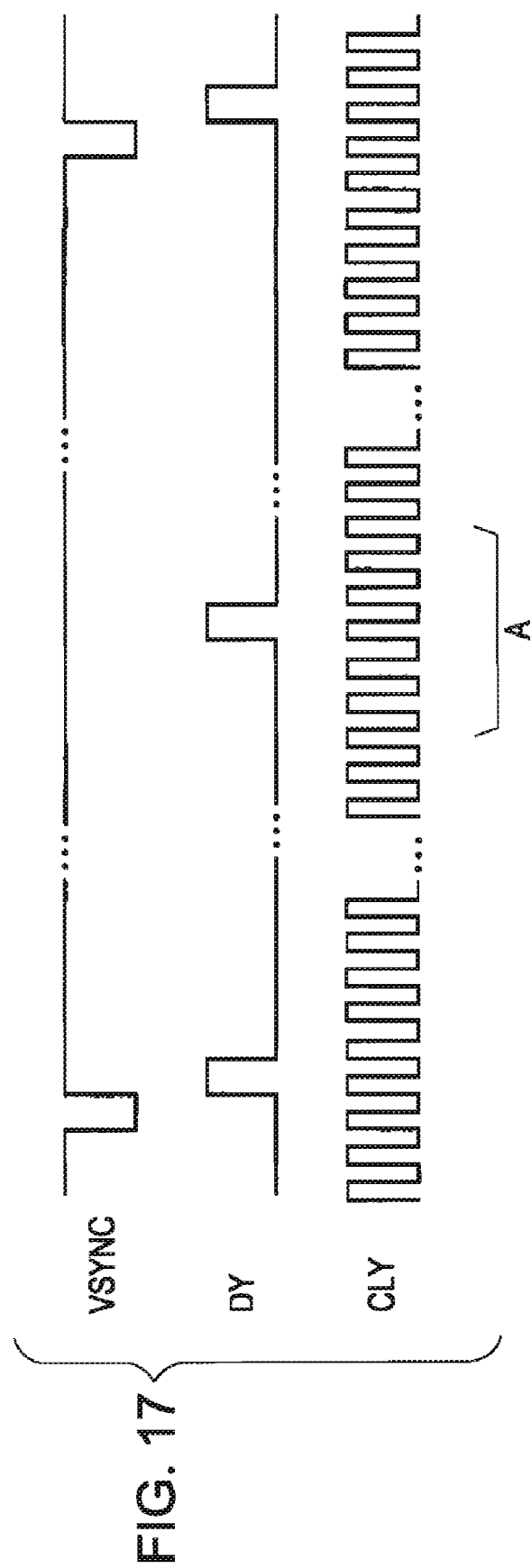
FIG. 17 is a timing chart illustrating an operation of the liquid crystal device.
Figure 18:
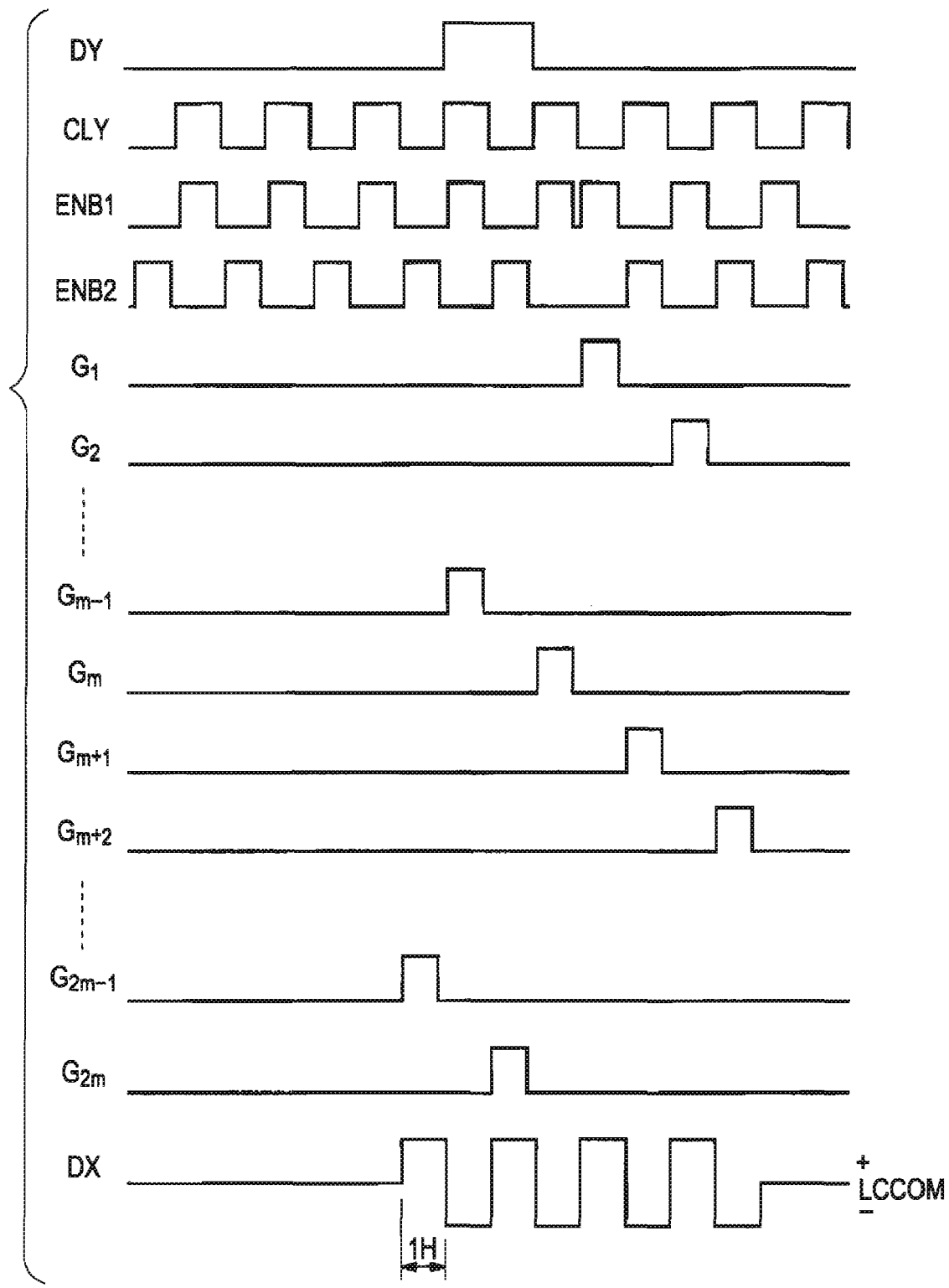
FIG. 18 is a timing chart showing main units of FIG. 17.
Figure 19:
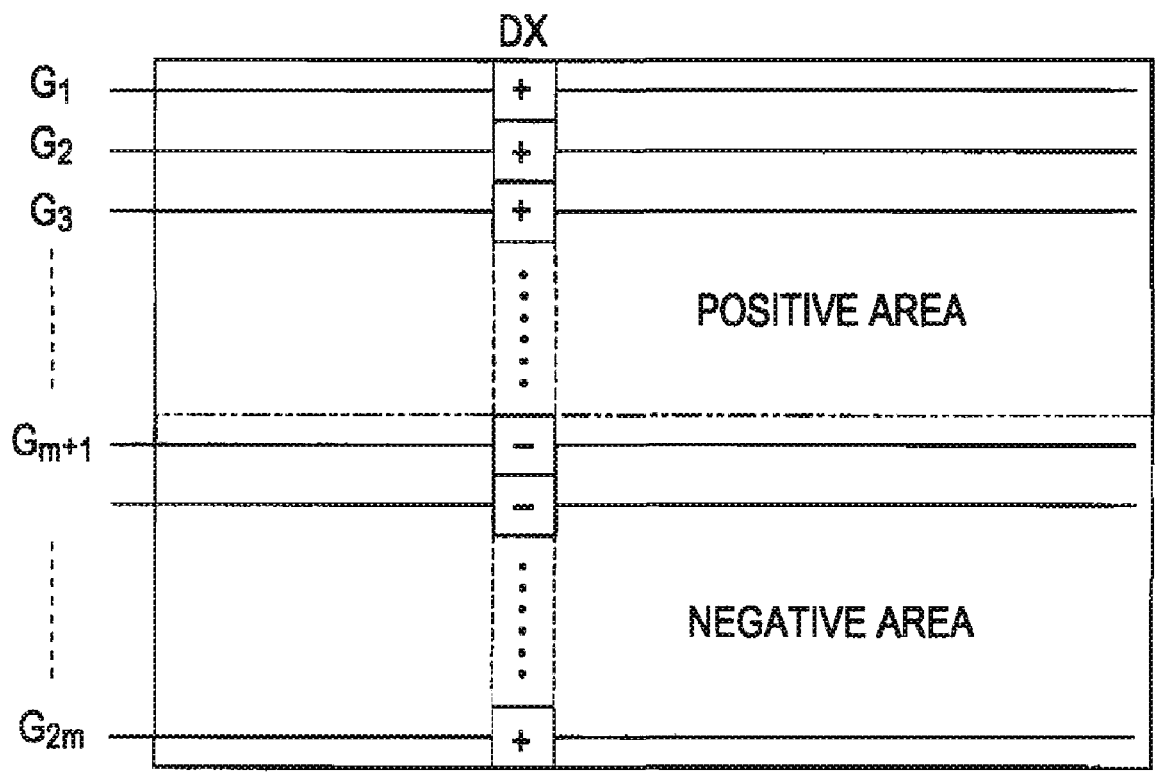
FIG. 19 is a view showing an image on a screen of the liquid crystal device.
Figure 20:
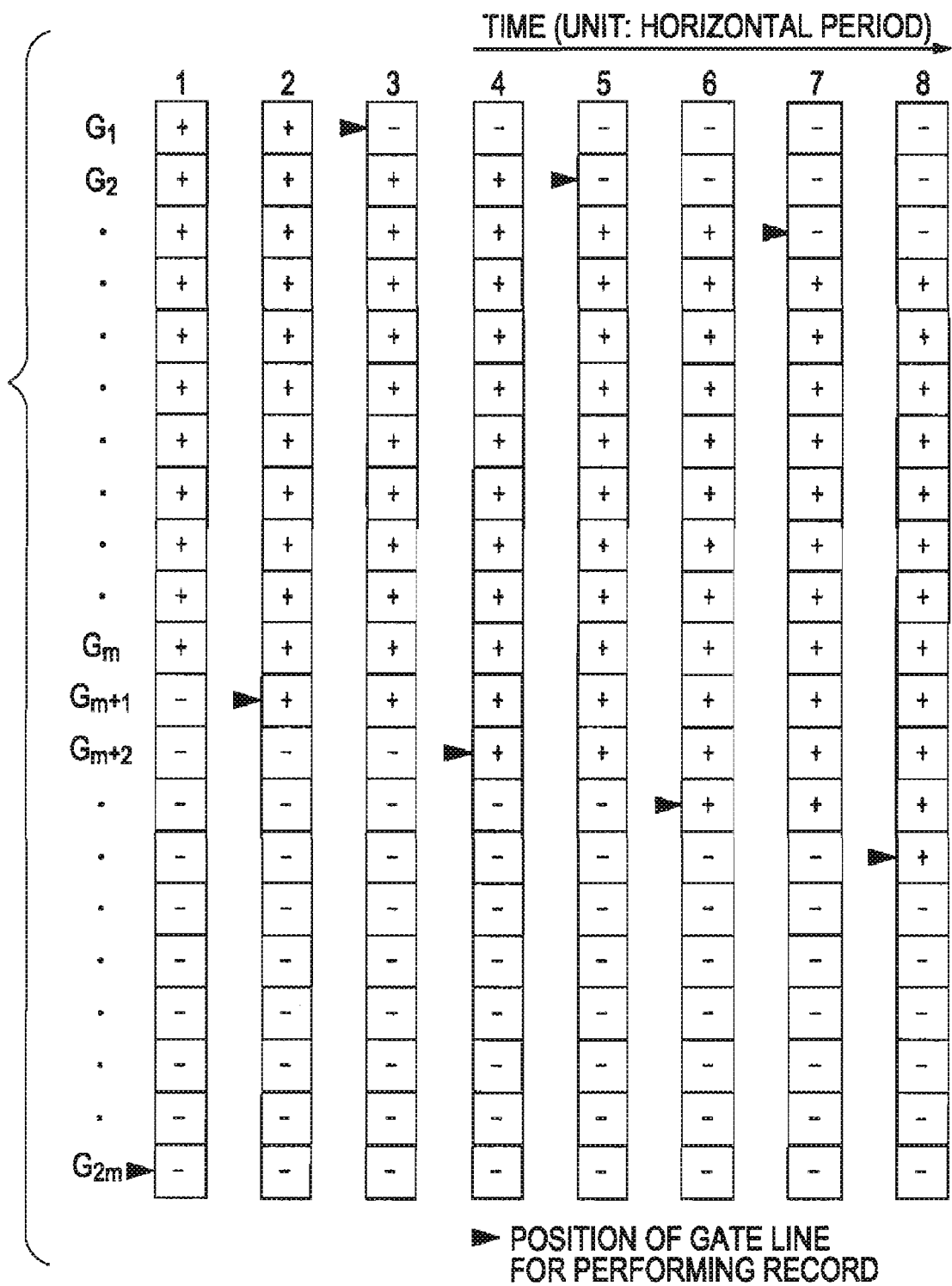
FIG. 20 is a view illustrating a motion on the screen.

FIG. 11 is a schematic view showing the configuration of the liquid crystal device, FIG. 12 is a cross-sectional view taken along line H-H' of FIG. 11, FIG. 13 is an equivalent circuit diagram of a plurality of pixels which configures the liquid crystal device and is formed in a matrix, FIG. 14 is a block diagram showing a driving circuit unit, FIG. 15 is a circuits diagram showing the configuration of a scan driver in the driving circuit unit, FIG. 16 is a detailed circuit diagram of main units of FIG. 15, FIG. 17 is a timing chart illustrating an operation of the liquid crystal device, FIG. 18 is a timing chart showing main units of FIG. 17, FIG. 19 is a view showing an image on a screen, and FIG. 20 is a view illustrating a motion on the screen. In the drawings, scale sizes of layers or members are different in order to recognize the layers or the members in the drawings.

In the configuration of the liquid crystal light valve 1 according to the present embodiment, as shown in FIGS. 11 and 12, a sealing material 52 is provided on the TFT array substrate 10 along the edge of the opposite substrate 20 and a light-shielding film 53 (surrounding break line part) is provided in parallel to the inside thereof as a frame. The light-shielding film 53 is provided at the outside of the pixel arranged in the matrix and defines an outer frame of the image display region. A data driver (data line driving circuit) 201 and an external circuit connection terminal 202 are provided on the outside region of the seal material 52 along one side of the TFT array substrate 10 and a scan driver (scanning line driving circuit) 104 is provided along two sides adjacent to one side.

A plurality of wirings 105 for connecting the scan drivers 104 provided at the both sides of the image display region is provided at the remaining side of the TFT array substrate 10. On at least one of corners of the opposite substrate 20, a vertical conduction material 106 for electrically connecting the TFT array substrate 10 and the opposite substrate is provided. As shown in FIG. 12, the opposite substrate having the same contour as that of the sealing material 52 shown in FIG. 11 is attached to the TFT array substrate 10 by the sealing material 52 and a liquid crystal layer 50 formed of TN liquid crystal is interposed between the TFT array substrate 10 and the opposite substrate 20. An opening 52a provided in the sealing material 52 shown in FIG. 11 is a liquid crystal injection part and is sealed by a sealing material 25.

In FIG. 13, in the plurality of pixels which configures the image display region of the liquid crystal light valve 1 according to the present embodiment and is formed in the matrix, the pixel electrode 9 and the TFT 30 for switching the pixel electrode 9 are formed and the data line 6a to which an image signal is supplied is electrically connected to the source region of the TFT 30. The liquid crystal light valve 1 according to the present embodiment has n data lines 6a and 2m scanning lines 3a (n and m are integers). Image signals S1, S2, . . . , and Sn recorded in the data line 6a may be sequentially supplied in this order or supplied to a group including a plurality of data lines 6a which are adjacent to each other.

The gate of the TFT 30 is electrically connected to the scanning line 3a and the scan signal G1, G2, . . . , and G2m are applied to the scanning lines 3a in pulse at a predetermined timing while skipping as described below. The pixel electrode 9 is electrically connected to the drain of the TFT 30 and the image signals S1, S2, . . . , and Sn supplied from the data lines 6a are recorded at a predetermined timing by turning on the TFT 30 which is the switching element at only a certain period. The image signals S1, S2, . . . , and Sn having a predetermined level recorded in the liquid crystal is held between the pixel electrode 9 and the common electrode formed on the opposite substrate 20 during a predetermined period. In order to prevent the held image signal from being leaked, the storage capacitor 70 is provided in parallel to liquid crystal capacitance formed between the pixel electrode 9 and the common electrode.

The driving circuit unit 60 of the liquid crystal light valve 1 according to the present embodiment, as shown in FIG. 14, includes a controller 61, a frame memory of two screens including a first frame memory 62 and a second frame memory 63, and a DA converter 64, in addition to the data driver 201 and the scan driver 104. One of the first frame memory 62 and the second frame memory 63 is used for temporarily storing an image of one frame input externally and the other thereof is used for display. The roles of the first frame memory and the second frame memory are changed in every one frame. A vertical synchronization signal Vsync, a horizontal synchronization signal Hsync, a dot clock signal dotclk and an image signal DATA are input to the controller 61, which performs the control of the first frame memory 62 and the second frame memory 63 and the read of the data corresponding to the scanning line 3a from the frame memory. The DA converter 64 DA-converts the data read from the frame memory and supplies the converted data to the data driver 201.

The configuration of the scan driver 104, as shown in FIG. 15, includes a shift register 66 which receives a gate output pulse DY, a clock signal CLY, an inverted clock signal CLY' from the controller 61 and 2m AND circuits 67 which receives the output from the shift register 66. The 2m scanning lines 3a are divided into two blocks using an $m^{th}$ and $m+1^{th}$ scanning lines as a boundary and the output from the shift register 66 is connected with one of two enable signals. That is, the output from the shift register 66 and the enable signal ENB1 are input to the AND circuit 67 corresponding to the scanning lines G1 to Gm and the output from the shift register 66 and the enable signal ENB2 are input to the AND circuit 67 corresponding to the scanning lines Gm+1 to G2m. The internal configuration of the shift register 66 included in a central portion of the screen is shown in FIG. 16.

Operation of Liquid Crystal Light Valve

The operation of the driving circuit unit 60 having the above configuration will be described using FIGS. 17 and 18.

As shown in FIG. 17, in the driving circuit unit 60, a gate output pulse DY is output twice during one vertical period. The gate output pulse DY is shifted in the shift register 66 of the scan driver 104 by the clock signal CLY in which one pulse rises in every horizontal period. As shown in FIG. 18 (a portion indicated by a reference numeral A of FIG. 17 is enlarged), when reaching to a region in which the gate output pulse DY is controlled by the other enable signal of the screen central portion, the phases of the enable signal ENB1 and the enable signal ENB2 are inverted. By the above operation, the gate pulses are alternatively output at two points of the screen which are separated by m scanning lines. That is, the gate pulses are sequentially output by skipping from a predetermined scanning line to a scanning line separated by m, returning a next scanning line of the predetermined scanning line, skipping from the next scanning line to a scanning line separated from m, and returning a scanning line next to the next scanning line (that is, in order of the scanning line $G_1$, the scanning line $G_{m+1}$, the scanning line $G_2$, the scanning line $G_{m+2}$, $G_3$, . . . ).

The polarity of the data signal Vd output from the data driver 201 is inverted to a positive potential and a negative potential on the basis of a common potential LCCOM in every horizontal period. Accordingly, the gate pulses are alternatively output in the above order at the two points of the screen separated by m scanning lines while the polarity of the data Vd is inverted in every horizontal period. As a result, as shown in FIG. 19, in any one horizontal period, as the dots corresponding to the scanning lines $G_1$ to $G_m$ becomes a region in which the data having the positive potential is recorded (hereinafter, referred to as a positive area) and the dots corresponding to the scanning lines $G_{m+1}$ to $G_{2m}$ becomes a region in which the data having the negative potential is recorded (hereinafter, referred to as a negative area), the screen image is divided into two regions in which data having different polarity is recorded, such as the positive area and the negative area.

FIG. 19 shows an image on the screen in any one horizontal period and FIG. 20 shows the change state of the polarity on the screen over time. If the horizontal axis of FIG. 20 indicates time (unit: one horizontal period), for example, in a first horizontal period, the negative potential is recorded in the dot corresponding to the scanning line $G_{2m}$. In a second horizontal period, the positive potential is recorded in the dot corresponding to the scanning line $G_{m+1}$ in which the negative potential was recorded in the first horizontal period. In a third horizontal period, the negative potential is recorded in the dot corresponding to the scanning line $G_1$ in which the positive potential was recorded in the first and second horizontal periods. Such recording operation is repeated. Accordingly, the positive area and the negative area are shifted one dot by one dot in every two horizontal periods so as to be shifted by a half of the screen in one vertical period. That is, the positive area and the negative area are completely inverted in one vertical period. In addition, the scanning of the scan line is performed at a frequency of at least 100 Hz in one vertical period.

In the liquid crystal light valve according to the present embodiment, the positive area and the negative area each having a half of the screen are inverted in one vertical period and surface inversion driving is performed in every area. In one vertical period, since any one dot and one dot adjacent thereto have opposite potentials in a time period of 2/2m and have the same potential in a remaining time period of (2m−2)/2m, discrination hardly occurs. As shown by the signal waveform of FIG. 18, since the same operation as that of the line inversion driving of the related art is performed with respect to the signal polarity in the data line 6a, there is no a difference in a temporal potential relationship between the pixel electrode and the data line in the upper pixels and the lower pixels of the screen as when driving is performed by the surface inversion method of the related art and thus display unevenness according to the location of the screen can be avoided while suppressing crosstalk. Unlike the related art, since most of one horizontal period is consumed for recording to the pixels, a problem that the record is insufficient does not occur.

In the present embodiment, since the scanning is performed at a frequency of at least 100 Hz, it is possible to surely suppress flicker.

Electronic Apparatus

Next, a projector which is an example of an electronic apparatus having the above liquid crystal device as a light valve will be described.

Figure 21:
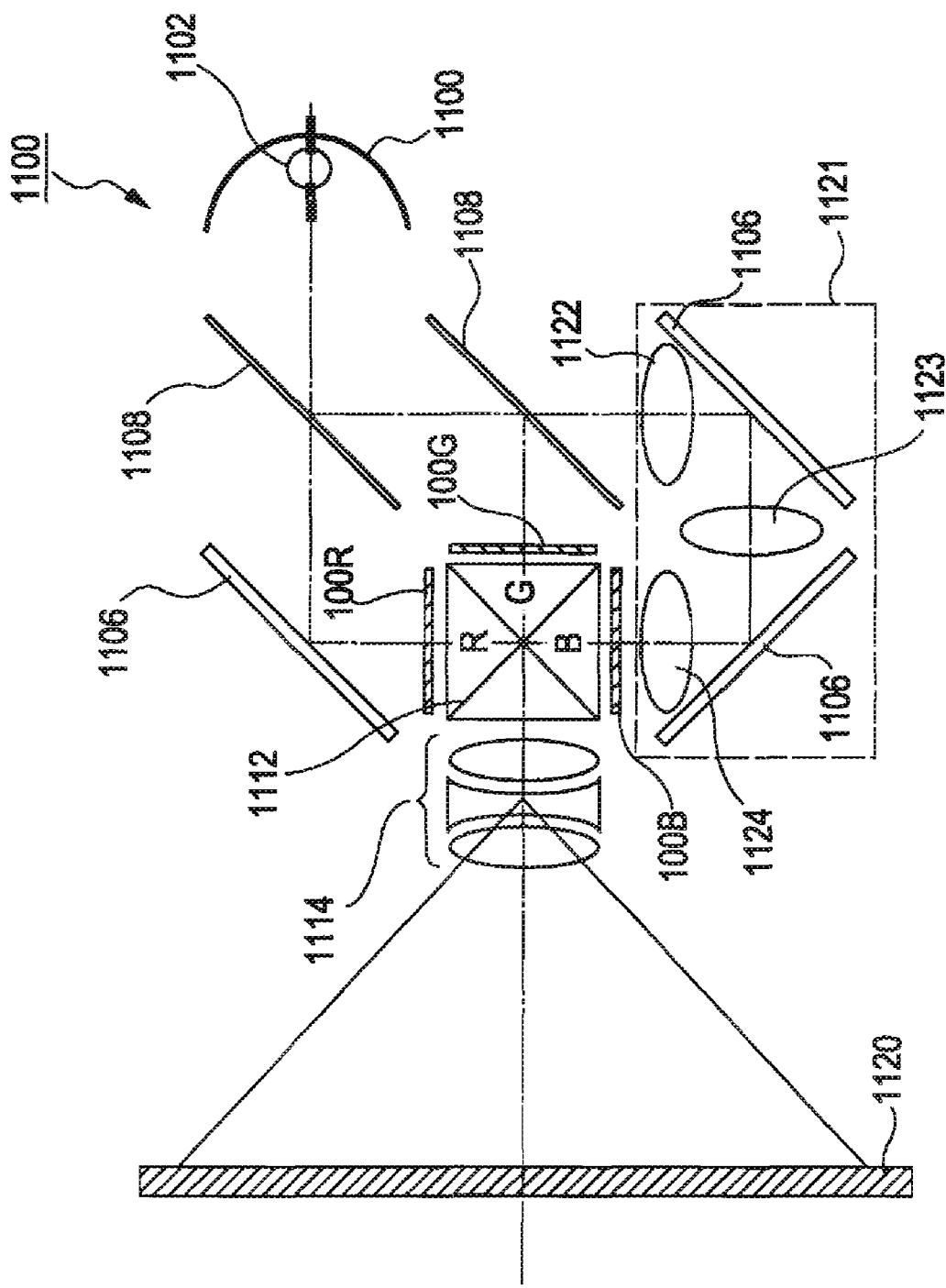
FIG. 21 is a schematic configuration view showing an example of a projector using the liquid crystal device according to the invention.

FIG. 21 is a schematic configuration view showing an example of a three-plate type multi-color liquid crystal projector using three liquid crystal light valves according to the above embodiment. In the drawing, a reference numeral 1100 denotes a light source, a reference numeral 1108 denotes a dichroic mirror, a reference numeral 1106 denotes a reflective mirror, reference numerals 1122, 1123 and 1124 denote a relay lens, reference numerals 100R, 100G and 100B denote liquid crystal light valves, a reference numeral 1112 denotes a cross dichroic prism, and a reference numeral 1114 denotes a projection lens system.

The light source 1100 includes a lamp 1102 such as metal halide and a reflector 1101 for reflecting light of the lamp 1102. The dichroic mirror 1108 for reflecting blue light and green light transmits red light of white light from the light source 1100 and reflects the blue light and the green light. The transmitted red light is reflected from the reflective mirror 1106 and enters the liquid crystal light valve 100R for red light.

Among color lights reflected from the dichroic mirror 1108, the green light is reflected from the dichroic mirror 1108 for reflecting the green light and enters the liquid crystal light valve 100G for green color. The blue light transmits through the second dichroic mirror 1108. In order to compensate the blue light having an optical path length different from those of the green light and the red light, light guide means 1121 including the relay lens system including an incident lens 1122, a relay lens 1123 and an exit lens 1124 is provided and the blue light enters the liquid crystal light value 100B for blue light through the relay guide means.

The three color lights modulated by the light valves 100R, 100G and 100B enters the cross dichroic prism 1112. This prism is formed by adhering four right-angle prisms and forming a dielectric multilayer film for reflecting the red light and a dielectric multilayer film for reflecting the blue light therein. The three color lights are synthesized by the dielectric multilayer films to form light for exhibiting a color image. The synthesized light is projected on a screen 1120 by the projection lens system 1114 which is a projection optical system such that an image is enlarged and displayed.

In the projector having the above configuration, the contrast of the pixel is suppressed from being reduced using the liquid crystal light valve according to the above embodiments and thus a seamless high-quality image which is capable of reducing image-quality deterioration due to the shadow of the lattice-shaped light-shielding film can be provided.

The technical scope of the invention is not limited to the above embodiments and the invention can be changed without departing from the scope of the invention. For example, although the screen image is divided into two regions or four regions for recording potentials having different polarities in the above embodiments, the number of divisions is not limited thereto and may be larger than those of the above embodiments. As the number of divisions increases, a time of the state where opposite potentials are applied to adjacent scanning lines increases. Even in this case, the time of a state cohere the same potential is applied occupies at least 50% of one vertical period. In addition, the order of the scanning in each region is not limited to the above embodiments and may be properly changed.

What is claimed is:

1. A liquid crystal device comprising:
a plurality of data lines and a plurality of scanning lines which cross each other;
switching elements which are provided in correspondence with intersections between the data lines and the scanning lines;
pixel electrodes connected to the switching elements;
pixels configured in correspondence with the pixel electrodes;
an image display region configured by a plurality of the pixels;
a first substrate having at least the switching elements;
a second substrate which faces the first substrate; and
liquid crystal interposed between the first substrate and the second substrate, wherein
light incident from the first substrate is modulated by the liquid crystal,
a light-shielding film is provided on a light incident side of at least the switching elements of the first substrate, the light-shielding film being omitted in a boundary of each pixel of the plurality of the pixels,
at least a portion corresponding to the image display region of the second substrate is transparent and transmits light incident to the liquid crystal,
a focusing unit which focuses light incident from the first substrate to an opening region of the light-shielding film is provided at a light incident side of the first substrate, and
an adhesive layer is disposed between the focusing unit and the first substrate.

2. The liquid crystal device according to claim 1, wherein the light-shielding film of the first substrate includes a first light-shielding film provided at the light incident side of the switching elements and a second light-shielding film provided at the opposite side of the light incident side of the switching elements.

3. The liquid crystal device according to claim 2, wherein the first substrate is provided with a first groove formed in a region in which the switching elements are disposed and a second groove formed in a region which faces the switching elements in the first groove, and the first light-shielding film is provided in the second groove.

4. The liquid crystal device according to claim 1, further comprising a driving circuit unit for supplying an image signal, whose polarity is inverted between a positive potential and a negative potential sequentially every unit period, to each of the plurality of data lines and supplying a plurality of pulse signals which rise at different timings to each of the plurality of scanning lines while skipping portions of the plurality of scanning lines, wherein, in any one horizontal driving period, the driving circuit unit is driven such that the plurality of scanning lines to which a pulse signal which rises at a timing corresponding to a period for applying the positive potential of the image signal is supplied are adjacent to each other and the plurality of scanning lines to which a pulse signal which rises at a timing corresponding to a period for applying the negative potential is supplied are adjacent to each other.

5. A projector comprising the liquid crystal device according to claim 1 as a spatial light modulation device.

6. The liquid crystal device according to claim 1, wherein the focusing unit further comprises a micro-lens array having a plurality of micro-lens, wherein the plurality of micro-lens are disposed entirely within each of the opening portions of the light-shielding film.

7. A liquid crystal device comprising:
a plurality of data lines and a plurality of scanning lines which cross each other;
switching elements which are provided in correspondence with intersections between the data lines and the scanning lines;
pixel electrodes connected to the switching elements;
pixels configured in correspondence with the pixel electrodes;
an image display region configured by a plurality of the pixels;
a first substrate having at least the switching elements;
a second substrate which faces the first substrate; and
liquid crystal interposed between the first substrate and the second substrate, wherein
light incident from the first substrate is modulated by the liquid crystal,
a light-shielding film is provided on a light incident side of at least the switching elements of the first substrate, the light-shielding film being omitted in a boundary of each pixel of the plurality of the pixels,
at least a portion corresponding to the image display region of the second substrate is transparent and transmits light incident to the liquid crystal, and
a focusing unit which focuses light incident from the first substrate to an opening region of the light-shielding film is provided at a light incident side of the first substrate, the focusing unit including a plurality of prism elements.

8. The liquid crystal device according to claim 7, wherein the light-shielding film of the first substrate includes a first light-shielding film provided at the light incident side of the switching elements and a second light-shielding film provided at the opposite side of the light incident side of the switching elements.

9. The liquid crystal device according to claim 8, wherein the first substrate is provided with a first groove formed in a region in which the switching elements are disposed and a second groove formed in a region which faces the switching elements in the first groove, and the first light-shielding film is provided in the second groove.

10. The liquid crystal device according to claim 7, further comprising a driving circuit unit for supplying an image signal, whose polarity is inverted between a positive potential and a negative potential sequentially every unit period, to each of the plurality of data lines and supplying a plurality of pulse signals which rise at different timings to each of the plurality of scanning lines while skipping portions of the plurality of scanning lines, wherein, in any one horizontal driving period, the driving circuit unit is driven such that the plurality of scanning lines to which a pulse signal which rises at a timing corresponding to a period for applying the positive potential of the image signal is supplied are adjacent to each other and the plurality of scanning lines to which a pulse signal which rises at a timing corresponding to a period for applying the negative potential is supplied are adjacent to each other.

11. A projector comprising the liquid crystal device according to claim 7 as a spatial light modulation device.

12. The liquid crystal display according to claim 7, further comprising an adhesive layer, the adhesive layer disposed between the focusing unit and the first substrate.

13. The liquid crystal display according to claim 7, wherein the plurality of prism elements are disposed on the light-shielding film such that the plurality of prism elements do not extend within the opening portions of the light-shielding film in plan view.

* * * * *